United States Patent
Hohenberger et al.

(10) Patent No.: US 8,094,810 B2
(45) Date of Patent: Jan. 10, 2012

(54) UNIDIRECTIONAL PROXY RE-ENCRYPTION

(75) Inventors: Susan R. Hohenberger, Cambridge, MA (US); Kevin Fu, Hadley, MA (US); Giuseppe Ateniese, Timonium, MD (US); Matthew Green, Baltimore, MD (US)

(73) Assignees: Massachusetts Institute of Technology, Cambridge, MA (US); The Johns Hopkins University, Baltimore, MD (US)

( * ) Notice: Subject to any disclaimer, the term of this patent is extended or adjusted under 35 U.S.C. 154(b) by 1743 days.

(21) Appl. No.: 11/347,794

(22) Filed: Feb. 3, 2006

(65) Prior Publication Data

US 2008/0059787 A1 Mar. 6, 2008

(51) Int. Cl.
*H04K 1/00* (2006.01)
(52) U.S. Cl. .......................................... 380/28; 713/153
(58) Field of Classification Search .................. 713/153, 713/150; 380/28, 30
See application file for complete search history.

(56) References Cited

U.S. PATENT DOCUMENTS

| 6,587,946 | B1 | 7/2003 | Jakobsson | |
|---|---|---|---|---|
| 6,687,822 | B1 | 2/2004 | Jakobsson | |
| 7,286,665 | B1 * | 10/2007 | Wang | 380/30 |
| 2003/0081785 | A1 * | 5/2003 | Boneh et al. | 380/277 |
| 2005/0172127 | A1 | 8/2005 | Hartung et al. | |
| 2006/0129847 | A1 * | 6/2006 | Pitsos | 713/193 |

* cited by examiner

*Primary Examiner* — Kim Vu
*Assistant Examiner* — Suman Debnath
(74) *Attorney, Agent, or Firm* — Chapin IP Law, LLC

(57) ABSTRACT

A method for performing unidirectional proxy re-encryption includes generating a first key pair comprising a public key (pk) and a secret key (sk) and generating a re-encryption key that changes encryptions under a first public key $pk_a$ into encryptions under a second public key $pk_b$ as $rk_{A \to B}$. The method further includes performing one of the group consisting of encrypting a message m under public key $pk_a$ producing a ciphertext $c_a$, re-encrypting a ciphertext $c_a$ using the re-encryption key $rk_{A \to B}$ that changes ciphertexts under $pk_a$ into ciphertexts under $pk_b$ to produce a ciphertext $c_b$ under $pk_b$, and decrypting a ciphertext $c_a$ under $pk_a$ to recover a message m. The method also includes encrypting a message m under a public key pk producing a first-level ciphertext $c^1$ that cannot be re-encrypted, and decrypting a first-level ciphertext $c^1$ using secret key sk.

29 Claims, 12 Drawing Sheets

UNIDIRECTIONAL PROXY RE-ENCRYPTION

STATEMENT REGARDING FEDERALLY SPONSORED RESEARCH

This invention was made with government support under NSF grant G420-E49-2007. The Government may have certain rights in this invention

BACKGROUND

Encryption is a process of translating a message, called the plaintext, into an encoded message, called the ciphertext. This is usually accomplished using a secret key and a cryptographic cipher. Two basic types of encryption are commonly used: symmetric encryption, where a single secret key is used for both encryption and decryption and asymmetric encryption, where a pair of keys is used—one for encryption and the other for decryption.

The use of encryption/decryption is a good idea when carrying out any kind of sensitive transaction, such as a credit-card purchase online, or the discussion of a company secret between different departments in the organization. The stronger the cipher—that is, the harder it is for unauthorized people to break it—the better, in general.

An application called atomic proxy re-encryption is a mechanism by which a semi-trusted proxy converts a ciphertext for a first user (Alice) into a ciphertext for a second user (Bob) without seeing the underlying plaintext. It is expected that fast and secure re-encryption will become increasingly popular as a method for managing encrypted file systems. Although efficiently computable, the widespread adoption of re-encryption has been hindered by considerable security risks.

A methodology for delegating decryption rights was first introduced by Mambo and Okamoto purely as an efficiency improvement over traditional decrypt-and-then-encrypt approaches. Blaze, Bleumer, and Strauss (BBS) proposed the notion of "atomic proxy cryptography," in which a semi-trusted proxy computes a re-encryption function given a re-encryption key that converts ciphertexts for Alice into ciphertexts for Bob without seeing the underlying plaintext.

Jakobsson developed a quorum-based protocol where the proxy is divided into sub-components, each controlling a share of the re-encryption key. In this approach the keys of the delegator are safe so long as some of the proxies are honest. A similar approach was considered by Zhou, Mars, Schneider and Redz. Recently, Dodis and Ivan realized unidirectional proxy encryption for Elgamal, RSA, and an IBE scheme by sharing the user's secret key between two parties. In their unidirectional Elgamal scheme, Alice's secret key s is divided into two shares $s_1$ and $s_2$, where $s=s_1+s_2$, and distributed to the proxy and Bob. On receiving ciphertexts of the form ($mg^{sk}$, $g^k$), the proxy first computes ($mg^{sk}/(g^k)^{s_1}$), which Bob can decrypt as ($mg^{s_2k}/(g^k)^{s_2}$)=m.

Proxy re-encryption has many applications including, but not limited to, email forwarding, law enforcement, and performing cryptographic operations on storage-limited devices. In particular, proxy cryptography has natural applications to secure network file storage.

SUMMARY

Conventional mechanisms such as those explained above suffer from a variety of deficiencies. In conventional Elgamal based re-encryption scheme due to Blaze, Bleumer and Strauss (BBS), with modulus a safe prime p=2q+1, the proxy is entrusted with the re-encryption key b/a mod q for the purpose of diverting ciphertexts from Alice to Bob via computing ($mg^k$ mod p, $(g^{ak})^{b/a}$ mod p). This scheme however contains an inherent restriction: it is bidirectional, that is, the value b/a can be used to divert ciphertexts from Alice to Bob and vice versa. Thus, this scheme is only useful when the trust relationship between Alice and Bob is mutual. (This problem can be solved, for any scheme, by generating an additional, otherwise unused, key pair for the delegatee, but this introduces additional overhead.) The BBS scheme leaves several open problems. Delegation in the BBS scheme is transitive, which means that the proxy alone can create delegation rights between two entities that have never agreed on this. For example, from the re-encryption key mapping ciphertexts for Alice to ciphertexts for Bob and the key mapping ciphertexts for Bob to ciphertexts for Carol, the proxy can re-encrypt messages from Alice to Carol. Another drawback to this scheme is that if the proxy and Bob collude, they can recover her secret key as (a/b) * b=a.

The "secret-sharing" schemes do not change ciphertexts for Alice into ciphertexts for Bob in the purest sense (i.e., so that Bob can decrypt them with his own secret key), they delegate decryption by requiring Bob to store additional secrets (i.e., shares $\{s_2^{(i)}\}$) that may in practice be difficult for him to manage. Thus, proxy re-encryption protocols combining the various advantages of the BBS and Dodis-Ivan schemes, along with new features such as time-limited delegations, remained an open problem.

Embodiments of the invention significantly overcome such deficiencies and provide mechanisms and techniques that provide unidirectional proxy re-encryption. New re-encryption schemes that realize a stronger notion of security, are presented. In one embodiment, the present invention allows users to temporarily delegate their ability to decrypt confidential messages to other individuals. By way of the present invention a user has the ability to re-encrypt encrypted messages from one user's key (recipient key) to another user's key (delegatee key) without requiring the delegatee to reveal secret keys. A two-level encryption system is provided in which senders can choose to author re-encryptable messages and non-reencryptable messages. The property of "proxy invisibility" is provided, wherein recipients of a message are prevented from determining whether they are the original recipient of the message or whether the message has been re-encrypted from another user's key. The property of "master secret security" is also provided in which certain elements of secret keys are protected even when a proxy and user collude. The proxy re-encryption mechanism is efficient in that re-encrypted ciphertexts may be decrypted using existing encryption packages.

In a particular embodiment, a method for performing unidirectional proxy re-encryption includes generating a first key pair comprising a public key (pk) and a secret key (sk) and generating a re-encryption key that changes encryptions under a first public key $pk_a$ into encryptions under a second public key $pk_b$ as $rk_{A \to B}$. The method further includes performing one of the group consisting of encrypting a message m under public key $pk_a$ producing a ciphertext $c_a$, re-encrypting a ciphertext $c_a$ using the re-encryption key $rk_{A \to B}$ that changes ciphertexts under $pk_a$ into ciphertexts under $pk_b$ to produce a ciphertext $c_b$ under $pk_b$, and decrypting a ciphertext $c_a$ under $pk_a$ to recover a message m. The method also includes encrypting a message m under a public key pk producing a first-level ciphertext $c^1$ that cannot be re-encrypted, and decrypting a first-level ciphertext $c^1$ using secret key sk. Additionally the method includes performing at least one of the group consisting of producing a decryption of said first level ciphertext $c_a^1$ and producing a decryption of said second ciphertext $C_b^2$.

In yet another embodiment, a method for performing temporary unidirectional proxy re-encryption begins with generating an arbitrary number of key pairs, each key pair comprising a public key (pk) and a secret key (sk). The method continues with generating a temporary public base $h_i$ for time period i for revocation and generating a temporary re-encryption key that changes encryptions during time period i under a first public key $pk_a$ into encryptions for time period i under a second public key $pk_b$ as $rk^i_{A \to B}$; The method further includes performing one of the group consisting of encrypting a message m under public key $pk_a$ producing a ciphertext $c_a$ for time period i, re-encrypting a ciphertext $c_a$ for time period i using the re-encryption key $rk_{A \to B}$ that changes ciphertexts under $pk_a$ into ciphertexts under $pk_b$ to produce a ciphertext $c_b$ under $pk_b$, and decrypting a ciphertext $c_a$ for time period i under $pk_a$ to recover a message m.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides unidirectional proxy re-encryption as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing unidirectional proxy re-encryption as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
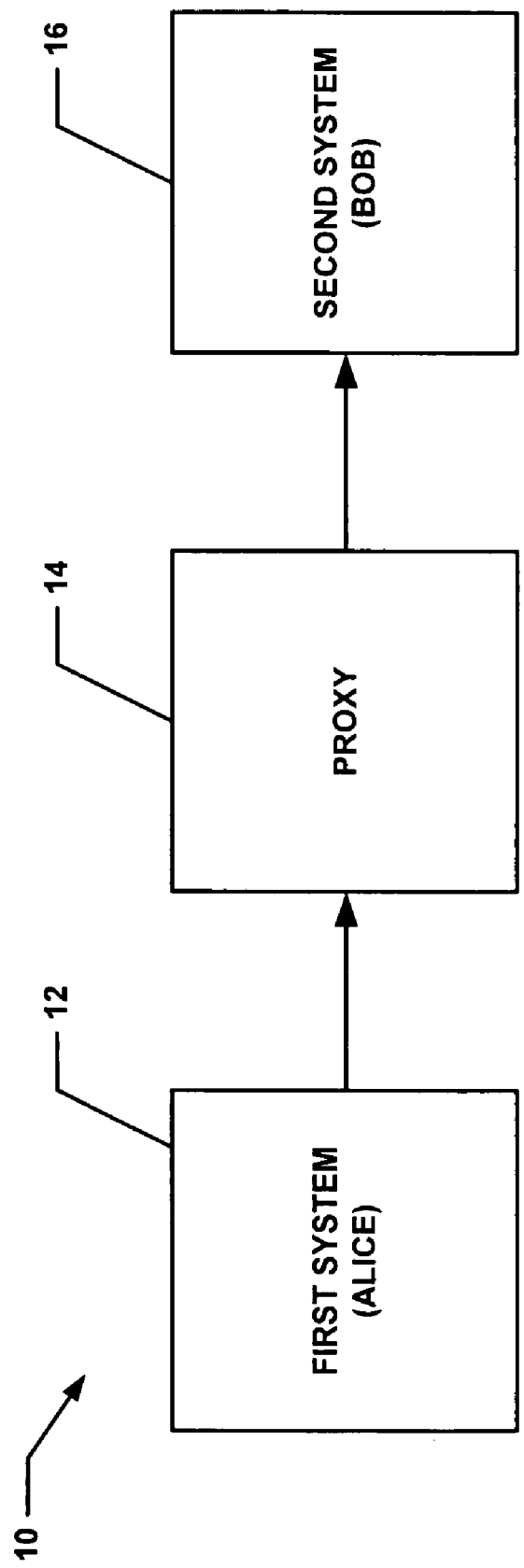
FIG. 1 illustrates a high-level block diagram of an environment for performing unidirectional proxy re-encryption in accordance with embodiments of the invention.

Proxy re-encryption allows a proxy to transform a ciphertext computed under a first user's public key into one that can be opened by a second user's secret key. Referring to FIG. 1, an environment 10 for performing proxy re-encryption is shown. In this environment 10, a proxy 14 is able to transform a ciphertext computed under a first system 12 (Alice's) public key into one that can be opened by second system 16 (Bob's) secret key.

There are many useful applications of this primitive. For instance, Alice 12 might wish to temporarily forward encrypted email to her colleague Bob 16, without giving him her secret key. In this case, Alice 12 the delegator could designate a proxy 14 to re-encrypt her incoming mail into a format that Bob 16 the delegatee can decrypt using his own secret key. Alice 12 could simply provide her secret key to the proxy 14, but this requires an unrealistic level of trust in the proxy.

A unidirectional proxy re-encryption schemes offers security improvements over earlier approaches. One advantage of the presently disclosed unidirectional proxy re-encryption schemes is that they are unidirectional (i.e., Alice can delegate to Bob without Bob having to delegate to her) and do not require delegators to reveal all of their secret key to anyone—or even interact with the delegatee—in order to allow a proxy to re-encrypt their ciphertexts.

In the presently disclosed schemes, only a limited amount of trust is placed in the proxy. For example, it is not able to decrypt the ciphertexts it re-encrypts, and these schemes are secure even when the proxy publishes all the reencryption information it knows. This enables a number of applications that would not be practical if the proxy needed to be fully trusted.

Figure 2:
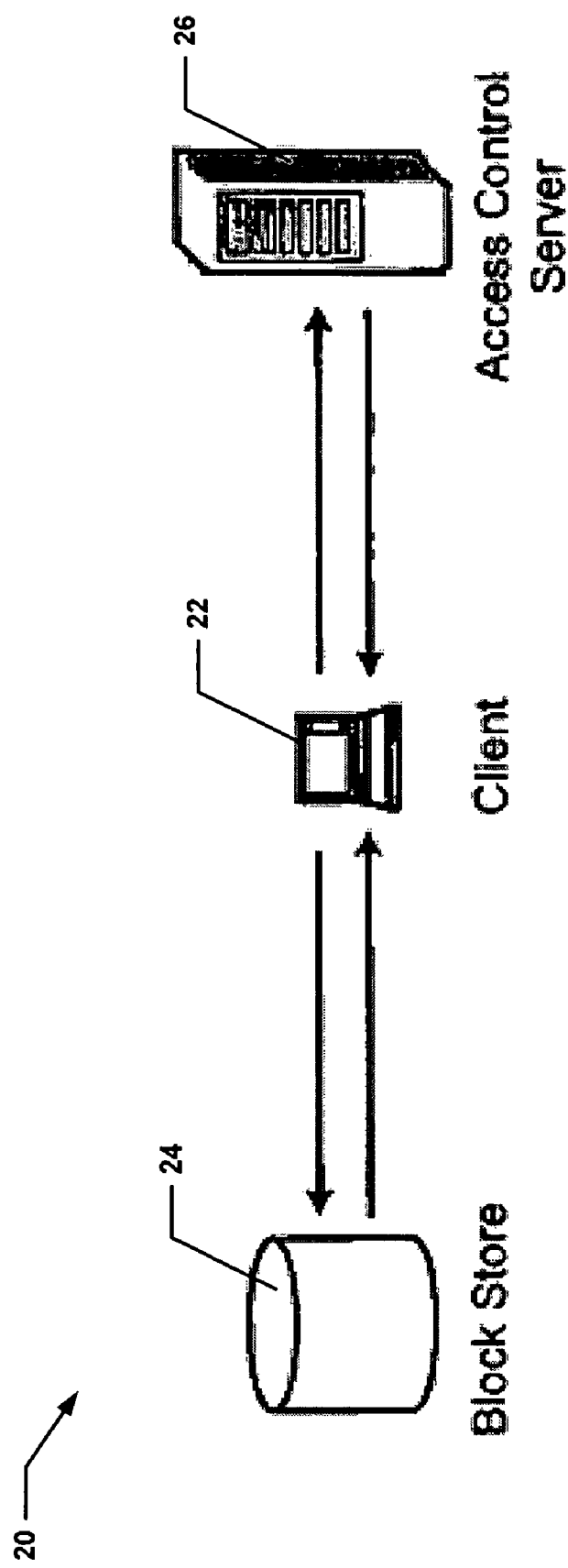
FIG. 2 illustrates a high-level block diagram of an environment for performing unidirectional proxy re-encryption as part of a secure file system.

In a particular application, shown in FIG. 2, a secure file system is a natural application of proxy re-encryption because the system often assumes a model of untrusted storage. A number of file systems build confidential storage out of untrusted components by using cryptographic storage. Confidentiality is obtained by encrypting the contents of stored files. These encrypted files can then be stored on untrusted file servers. The server operators can distribute encrypted files without having access to the plaintext files themselves. In a single-user cryptographic file system, access control is straightforward. The user creates and remembers all the keys protecting content. Thus, there is no key distribution problem. With group sharing in cryptographic storage, group members must rendezvous with content owners to obtain decryption keys for accessing files.

Systems with cryptographic storage such as the SWALLOW object store or CNFS assume an out-of-band mechanism for distributing keys for access control. Other systems such as Cepheus use a trusted access control server to distribute keys.

The access control server model requires a great deal of trust in the server operator. Should the operator prove unworthy of this trust, he or she could abuse the server's key material to decrypt any data stored on the system. Furthermore, even if the access control server operator is trustworthy, placing so much critical key data in a single location makes for an inviting target.

This system 20 makes use of a semi-trusted access control server 26. A significant security improvement to the access control in cryptographic storage is provided using proxy cryptography to reduce the amount of trust in the access control server 26. In this approach, keys protecting files are stored encrypted under a master public key. When a user requests a key, the access control server 26 uses proxy cryptography to directly re-encrypt the appropriate key to the user without learning the key in the process. Because the access control server 26 does not itself possess the master secret, it cannot decrypt the keys it stores. The master secret key can be stored offline, by a content owner who uses it only to generate the re-encryption keys used by the access control server.

In operation of the proxy re-encryption file system 20, the user's client machine 22 fetches encrypted blocks from the block store 24. Each block includes a lockbox encrypted under a master public key. The client 22 then transmits lockboxes to the access control server 26 -for re-encryption under the user's public key. If the access control server 26 possesses the necessary re-encryption key, it re-encrypts the lockbox and returns the new ciphertext. The client 22 can then decrypt the re-encrypted block with the user's secret key.

Another promising application of proxy re-encryption is the filtering of encrypted emails performed by authorized contractors. The sheer volume of unsolicited email, along with rapid advances in filter-avoidance techniques, has overwhelmed the filtering capability of many small businesses, leading to a potential market for outsourced email filtering. New privacy regulations, such as the US Health Insurance Portability and Accountability Act (HIPAA), are encouraging companies to adopt institution-wide email encryption to ensure confidentiality of patient information. By accepting encrypted email from outside sources, institutions become "spam" targets and filters are only effective on messages that are first decrypted (which could be unacceptably costly). Using proxy re-encryption, it becomes possible to redirect incoming encrypted email to an external filtering contractor at the initial mail gateway, without risking exposure of plaintexts at the gateway itself.

A. few terms used throughout the specification will be defined. The first term is a Bilinear Map. A map $e: G_1 \times \hat{G}_1 \to G_2$ is a bilinear map if: (1) $G_1, \hat{G}_1$ are groups of the same prime order q; (2) for all $a, b \in Z_q, g \in G_1$, then $e(g^a, h^b) = e(g, h)^{ab}$ is efficiently computable; and (3) the map is non-degenerate (i.e., if g generates $G_1$ and h generates $\hat{G}_1$, then $e(g,h)$ generates $G_2$). In the scheme descriptions $G_1$ and $\hat{G}_1$ are treated as the same group. However, for some instantiations of the mappings, it is more efficient to let $G_1$ and $\hat{G}_1$ be distinct groups of size q.

A unidirectional proxy re-encryption scheme is a tuple of (possibly probabilistic) polynomial time algorithms (KG, RG, $\vec{E}$, R, $\vec{D}$), where the components are defined as follows:

KG, $\vec{E}$, $\vec{D}$ are the standard key generation, encryption, and decryption algorithms for the underlying cryptosystem. Here $\vec{E}$ and $\vec{D}$ are (possibly singleton) sets of algorithms. On input the security parameter $1^k$, KG outputs a key pair (pk,sk). On input $pk_A$, and message $m \in M$, for all $E_i \in \vec{E}$ the output is a ciphertext $C_A$. On input $sk_A$ and ciphertext $C_A$, there exists a $D_i \in \vec{D}$ that outputs the message $m \in M$.

On input $(pk_A, skA_A^+, pk_B, Sk_B^*)$, the re-encryption key generation algorithm, RG, outputs a key $rk_{A \to B}$ for the proxy. The fourth input marked with a "*" is sometimes omitted; when this happens we say that RG is non-interactive since the delegatee does not need to be involved in the generation of the re-encryption keys. The second input marked with a "+" may in some cases be replaced by the tuple $(rk_{A \to C}, sk_C)$. On input $rk_{A \to B}$ and ciphertext $C_A$, the re-encryption function, R, outputs $C_B$.

A party holding a secret key skA should always be able to decrypt ciphertexts encrypted under $pk_A$; while a party B should be able to decrypt $R(rk_{A \to B}, C_A)$. $\vec{E}$ may contain multiple encryption algorithms; for example, having first-level encryptions that cannot be re-encrypted by the proxy; while second-level encryptions can be re-encrypted by the proxy and then decrypted by delegatees. This provides the sender with a choice given the same public key whether to encrypt a message only to Alice or to Alice and, say, her secretary. Whenever a re-encryption does take place, however, the underlying plaintext is required to remain consistent—i.e., Bob should get exactly what Alice was supposed to receiver Key pairs $(pk_A, sk_A)$ and $(pk_B, sk_B)$, are generated according to KG, belong to parties A and B, respectively, and $rk_{A \to B}$ is generated according to RG. Then, for all messages m in the message space M, the following equations hold with probability one:

$$\forall E_i \in \vec{E}, \exists D_j \in \vec{D}, \_D_j(sk_A, E_i(pk_A, m)) = m,$$

$$\exists E_i \in \vec{E}, \exists D_j \in \vec{D}, \_D_j(sk_B, R(rk_{A \to B}, pk_A, m)) = m.$$

A security definition is provided similar to that of Dodis and Ivan. Although their definition was for CCA2 security, they instead used CPA security for the Elgamal, RSA, and IBE-based schemes; for simplicity, the present invention focuses directly on CPA security. The first main difference between the present definitions is that the security of a user is considered against a group of colluding parties; for example, the security of a delegator against the proxy and many delegatees, whereas the Dodis-Ivan definition focused on a single delegatee.

Secondly, the system's security for circular delegation is discussed where the adversary watches Alice and Bob delegate to each other. A new guarantee is provided for the delegator—even if the proxy and all delegatees collude, they cannot recover his master secret key.

The security of Unidirectional Proxy Re-encryption will be explained. Let $\Gamma=(KG, RG, \vec{E}, R, \vec{D})$ be a unidirectional proxy re-encryption scheme.

The underlying cryptosystem $(KG, \vec{E}, \vec{D})$ is semantically secure against anyone who has not been delegated the right to decrypt. Subscript B is used to denote the target user, x to denote the adversarial users, and h to denote the honest users (other than B). That is, for all PPT algorithms $A_k$, $E_i \in \vec{E}$ and $m_0, m_1 \in M_k$, $$Pr\{(pk_B, sk_B) \leftarrow KG(1^k), \{(pk_x, sk_x) \leftarrow KG(1^k)\},$$

$$\{rk_{x \to B} \leftarrow RG(pk_x, sk_x, pk_B, sk_B^*)\},$$

$$\{(pk_h, sk_h) \leftarrow KG(1^k)\},$$

$$\{rk_{B \to h} \leftarrow RG(pk_B, sk_B, pk_h, sk_h^*)\},$$

$$\{rk_{h \to B} \leftarrow RG(pk_h, sk_h, pk_B, sk_B^*)\},$$

$$(m_0, m_1, \alpha) \leftarrow$$

$$A_k(pk_B, \{(pk_x, sk_x)\}, \{pk_h\}, \{rk_{x \to B}\}, \{rk_{B \to h}\}, \{rk_{h \to B}\}),$$

$$b \leftarrow \{0, 1\}, b' \leftarrow A_k(\alpha, E_i(pk_B, m_b)):$$

$$b = b'] \text{ strictly less than } \frac{1}{2} + \frac{1}{poly(k)}.$$

The above definition captures B's security, even when the proxy (with knowledge of all the re-encryption keys) and a group of adversarial users (with knowledge of their own secret keys) collude against B—provided that B never delegated decryption rights to any adversarial user.

In the case that B does delegate decryption rights to an adversarial user, the adversary can simply decrypt and trivially win the game above. However, there is a need to determine whether or not an adversary (consisting of the proxy and a group of colluding users) can recover B's master secret key. Thus, just because B delegates decryption rights to another party does not mean that B surrenders his digital identity (i.e., the meaningful parts of his secret key).

Master Secret Security provides that the long-term secrets of a delegator (sometimes serving as a delegatee) cannot be computed or inferred by even a coalition of colluding delegatees. Subscript B is used to denote the target user and x to denote the adversarial users. For all PPT algorithms $A_k$.

$$Pr[(pk_B, sk_B) \leftarrow KG(1^k), \{(pk_x, sk_x) \leftarrow KG(1^k)\},$$

$$\{rk_{B \to x} \leftarrow RG(pk_B, sk_B, pk_x, sk_x^*)\},$$

$$\{rk_{x \to B} \leftarrow RG(pk_x, sk_x, pk_B, sk_B^*)\},$$

$$\alpha \leftarrow A_k(pk_B, \{(pk_x, sk_x)\}, \{rk_{B \to x}\}, \{rk_{x \to B}\}):$$

$$\alpha = sk_B] = v(k).$$

$$\alpha = sk_B] \text{ strictly less than } \frac{1}{poly(k)}.$$

Unfortunately, achieving security based on the definition of the re-encryption key generation function RG as originally stated is very difficult to realize. It is believed that there does not exist a scheme, including the prior work of Dodis and Ivan, that does not succumb to the follow attack: transfer of delegation rights, where, on input $sk_B$ and $rk_{A \to B}$, one can compute $rk_{A \to C}$. Consider that on input b and $g^{b/a}$, one can output $(g^{b/a})^{1/b} = g^{1/a}$, which would allow anyone to decrypt Alice's second-level ciphertexts. Thus, the definition of RG is modified to be executed with either the secret key of the delegator Alice $sk_A$ or with both a re-encryption key from Alice to Bob $rk_{A \to B}$ and Bob's secret key $sk_B$. This implies that Bob is allowed to transfer Alice's decryption capability. Arguably, this relaxed definition is not so damaging since Alice is already trusting Bob enough to delegate decryption rights to him.

At first glance, master secret security may seem weak. All it guarantees is that an adversary cannot output a delegator's secret key $sk_A$. One motivation, mentioned above, stems from the fact that some proxy re-encryption schemes define two or more types of ciphertext, some of which may only be decrypted using the master secret. A scheme which provides master secret security will protect those ciphertexts even in the event that the proxy and delegatee collude. A second motivation comes from the fact that most standard signature schemes are actually proofs of knowledge of a discrete logarithm value, such as $sk_A = a \in E \, Z_q$, (wherein $Z = e(g,g)$) turned into a signature using the Fiat-Shamir heuristic. Intuitively, if an adversary cannot output Alice's secret key, then the adversary cannot prove knowledge of it either. Thus, using a proxy re-encryption scheme with master secret security means that a user may be able to safely delegate decryption rights (via releasing $g^a$) without deleating signing rights for the same public key $Z^a$.

Presented below in Table 1 is a list of the most useful properties of proxy re-encryption protocols:

TABLE 1

| Property | BBS | Di | Present Invention |
| --- | --- | --- | --- |
| Unidirectional | No | Yes | Yes |
| Non-interactive | No | Yes | Yes |
| Proxy Invisible | Yes | No | Yes |
| Original-access | Yes | Yes | Yes |
| Key Optimal | Yes | No | Yes |
| Collusion-safe | No | No | Yes |
| Temporary | Yes | Yes | Yes |
| Non-transitive | No | Yes | Yes |
| Non-transferable | No | No | No |

The properties are defined below.

Unidirectional: Deleation from A→B does not allow re-encryption from B→A.

Non-interactive: Re-encryption keys can be generated by Alice using Bob's public key; no trusted third party or interaction is required.

Proxy invisibility: This is an important feature offered by the original BBS scheme. The proxy in the BBS scheme is transparent in the sense that neither the sender of an encrypted message nor any of the delegatees have to be aware of the existence of the proxy. Clearly, transparency is very desirable but it is achieved in the BBS scheme at the price of allowing transitivity of delegations and recovery of the master secrets of the participants. The present pairing-based schemes, to be described shortly, offer a weaker form of transparency which is referred to as proxy invisibility. In particular, both sender and recipient are aware of the proxy re-encryption protocol but do not know whether the proxy is active, has performed any action or made any changes, or even if it exists (the proxy is indeed "invisible"). More specifically, the sender is allowed to generate an encryption that can be opened only by the intended recipient (first-level encryption) or by any of the recipient's delegatees (second-level encryption). At the same time, it can be ensured that any delegatee will not be able to distinguish a first-level encryption (computed under his public key) from a re-encryption of a ciphertext intended for another party (we are assuming that the encrypted message does not reveal information that would help the delegatee to make this distinction).

Original-access: Alice can decrypt re-encrypted ciphertexts that were originally sent to her. In some applications, it may be desirable to maintain access to her re-encrypted ciphertexts. This is an inherent feature of the Dodis-Ivan schemes (since the re-encryption key is a share of the original); the BBS scheme and the pairing schemes presented here can achieve this feature by adding an additional term to the ciphertext: for example, in BBS a re-encrypted ciphertext with original access looks like $(mg^k, g^{ak}, (g^{ak})^{b/a})$. This may impact proxy invisibility.

Key optimal: The size of Bob's secret storage remains constant, regardless of how many delegations he accepts. This is referred to as a key optimal scheme. In the previous Elamal and RSA based schemes, the storage of both Bob and the proxy grows linearly with the number of delegations Bob accepts. This is an important consideration, since the safeguarding and management of secret keys is often difficult in practice.

Collusion-"safe": One drawback of all previous schemes is that by colluding, Bob and the proxy can recover Alice's secret key: for Dodis-Ivan, $s=s_1+s_2$; for BBS, $a=(a/b)*b$. In the present invention this problem is mitiated by allowing recovery of a "weak" secret key only. In a bilinear map setting, suppose Alice's public key is $e(g,g)^a$ and her secret key is a, then Bob and the proxy may be allowed to recover the value $g^a$, but not a itself. The property of collusion "safeness" is extremely useful in our context since we allow the sender to generate first-level encryptions, that can be opened only by the intended recipient (Alice), or second-level ones that can be opened by any of the recipient's delegatees (e.g., Bob). Indeed, this property implies that even if Bob and the proxy collude, they will not be able to open any of Alice's first level-encryptions. In general, collusion "safeness" allows Alice to delegate decryption rights, while keeping signing rights for the same public key. In practice, a user can always use two public keys for encryption and signatures, but it is theoretically interesting that the user doesn't need to do so. Prior work on "signcryption" explored this area. Present here is what can be viewed as the first "signREcryption" scheme.

Temporary: Dodis and Ivan suggested applying generic key-insulation techniques to their constructions to form schemes where Bob is only able to decrypt messages intended for Alice that were authored during some specific time period i. The present invention provides a bilinear map construction designed specifically for this purpose. A trusted server broadcasts a new random number at each time period, which each user can then use to update their delegated secret keys. This is an improvement over using current key-insulated schemes where the trusted server needs to individually interact with each user to help them update their master (and therefore, deleation) secret keys.

Non-transitive: The proxy, alone, cannot re-delegate decryption rights. For example, from $rk_{A \to B}$ and $rk_{A \to C}$, he cannot produce $rk_{A \to C}$.

Non-transferable: The proxy and a set of colluding delegatees cannot re-delegate decryption rights. For example, from $rk_{A \to B}, sk_b$ and $pk_c$, they cannot produce $rk_{A \to C}$. This is a very desirable property. For instance, a hospital may be held legally responsible for safeguarding the encrypted files of its patients; thus, if it chooses to delegate decryption capabilities to a local pharmacy, it may need some guarantee that this information "goes no further." The pharmacy can always decrypt and forward the plaintext files to a drug company. However, this approach requires that the pharmacy remain an active, online participant. It is desirable to prevent the pharmacy (plus the proxy) providing the drug company with a secret value that it can use offline to decrypt the hospital's ciphertexts. Again, the pharmacy can trivially send its secret key to the drug company. But in doing so, it assumes a security risk that is as potentially injurious to itself as the hospital. Achieving a proxy scheme that is non-transferable, in the sense that the only way for Bob to transfer offline decryption capabilities to Carol is to expose his own secret key, seems to be the main open problem left for proxy re-encryption.

As Dodis and Ivan pointed out, one method for deleating decryption rights is to create a cryptosystem that has a two-stage decryption procedure with two different secret keys. In practice, Alice's secret key s is divided into two shares: si, given to the proxy, and $s_2$, given to Bob. A ciphertext intended for Alice can be partially decrypted by the proxy via $s_1$. Bob can complete the decryption process by using 52 and then recover the message. This "secret sharing" approach does not exactly yield to proxy re-encryption schemes given that Bob must use secrets other than his own to recover the plaintext (i.e., there is no transformation of a ciphertext under Alice's public key into one under Bob's), In particular, this implies that the schemes are not key optimal, proxy invisible, or collusion-"safe." There are trivial solutions to the collusion-"safe" problem when Alice is allowed to use two different key pairs, however solutions that minimize the number of keys to safeguard and manage while remaining efficient are desired. Providing a cryptosystem that generates ciphertexts that can be fully decrypted using either of two distinct key is an improvement. In particular, a variant of the Paillier cryptosystem with two trapdoors proposed by Cramer and Shoup is considered. For simplicity, a version that is only semantically secure is described. This simplified scheme works in the cyclic group of quadratic residues modulo $n^2$.

The public key is $(n,g,h=g^x)$ with g of order $\lambda(n)=2p'q'$, the master secret key is the factorization of $n=pq$ (where $p=2p'+1, q=2q'+1$ are safe primes), and the "weak" secret key is $x \in [1, n^2/2]$. Such a g can be easily found by selecting a random $a \in Z_{n^2}^*$ and computing $g=-a^{2n}$.) To encrypt a message $m \in Z_n$, select a random $r \in [1, n/4]$ and compute: $T_1=g^r, T_2=h^r(1+mn) \pmod{n^2}$.

If x is known, then the message can be recovered as: $m=L(T_2/T_1^x \bmod n^2)$, where $$L(u) = \frac{u-1}{n},$$

for all $u \in \{u<n^2 | u=1 \bmod n\}$. If (p, q) are known, then m can be recovered from $T_2$ by noticing that $T_2^{\lambda(n) \times r}(1+m\lambda(n)n)=(1+m\lambda(n)n)$. Thus, given that $\gcd(\lambda(n),n)=1$, m can be recovered as: $m=L(T_2^{\lambda(n)} \bmod n^2)[\lambda(n)]^{-1} \bmod n$.

Part of the cryptosystem above can be seen as a variation of Elgamal when working modulo a squared composite number. So, similarly to the Dodis-Ivan scheme, we can divide x can be divided into two shares $x_1$ and $x_2$, such that $x=x_1+x_2$. The share $x_1$ is given to the proxy while $x_2$ is stored by Bob. The scheme is collusion-safe since only the "weak" secret x is exposed if Bob and the proxy collude, but the factors of n, p and q, remain secret. Indeed, one could send only the value $T_2$, rather than the ciphertext pair $(T_1, T_2)$, to allow Alice, and only her, to decrypt the message.

Although collusion-"safe," this scheme is not key optimal or proxy invisible but it remains theoretically interesting because it is not based on bilinear pairings. However, it cannot yet be seen as a pure proxy re-encryption scheme since there is no transformation of ciphertexts computed under Alice's key into ones under Bob's, One way to address this, which also applies to the Dodis-Ivan schemes, is to let the proxy store Bob's shares encrypted under his own public key. For instance, in the case where Alice is the deleator, the proxy could store $x_1$ and $x_2$, the latter encrypted under Bob's public key. The encrypted share will be sent to Bob along with the ciphertext partially decrypted by the proxy. This solution, however, is not satisfactory: It requires more bandwidth, it doubles the cost of decrypting, it forces Bob to perform distinct decryption procedures based on whether he receives ciphertexts intended for him or ciphertexts from the proxy, and it complicates the revocation of decryption rights.

A first method of performing unidirectional proxy re-encryption which minimizes a user's secret storage and thus become key optimal, a BBS, Elamal based scheme operating over two groups $G_1$, $G_2$ of prime order q with a bilinear map $e: G_1 \times \hat{G}_1 \rightarrow G_2$. The system parameters are random generators $g \in G_1$ and $Z = e(g,g) \in G_2$.

Key Generation (KG). A user A's key pair is of the form $pk_a = g^a$, $sk_a = a$.

Re-Encryption Key Generation (RG). A user A delegates to B by publishing the re-encryption key $rk_{A \rightarrow B} = g^{b/a} \in G_1$, computed from B's public key.

First-Level Encryption ($E_1$). To encrypt a message $m \in G_2$ under $pk_a$ in such a way that it can only be decrypted by the holder of $sk_a$, output $c = (Z^{qk}, mZ^k)$.

Second-Level Encryption ($E_2$). To encrypt a message $m \in G_2$ under $pk_a$ in such a way that it can be decrypted by A and her delegatees, output $c = (g^{ak}, mZ^k)$.

Re-Encryption (R). Anyone can change a second-level ciphertext for A into a first-level ciphertext for B with $rk_{A \rightarrow B} = g^{b/a}$. From $c_a = (g^{ak}, mZ^k)$ compute $e(g^{ak}, g^{b/a}) =$ publish $c_b = (Z^{bk}, mZ^k)$.

Decryption ($D_1, D_2$). To decrypt a first-level ciphertext $c_a = (\alpha, \beta)$ with secret key sk=a compute $m = \beta/\alpha^{1/a}$. To decrypt a second-level ciphertext $c_{ba} = (\alpha, \beta)$ with secret key sk=a, compute $m = \beta/e(\alpha, g)^{1/a}$.

This first method of performing unidirectional proxy re-encryption is very attractive; it is unidirectional, non-interactive, proxy invisible, collusion-safe, key optimal, and non-transitive. In particular, notice that first-level encryptions intended for Alice are safe even if Bob and the proxy collude. Indeed, the weak secret $g^{1/a}$ cannot be used to decrypt first-level encryptions (but only second-level ones, which Bob and the proxy can open anyway).

The scheme is also very efficient since both encryption and decryption operations are similar to those of plain Elamal while the pairing computation is only performed by the proxy.

The security of this scheme depends upon (at least) the assumption that the following problem is hard in ($G_1, G_2$):

Given $(g, g^a, g^b, Q)$, for $g \leftarrow G_1$, a, $b \leftarrow Z_q$ and $Q \in G_2$, decide if $Q = e(g,g)^{a/b}$.

To see where the above assumption comes into play, think of a $g^a$ as $g^{bk}$ for some $k \in Zq$. Now, consider the second-level ciphertext $c = (g^a, mQ)$ encrypted for public key $g^b$ for message m. If $Q = e(g, g)^{a/b} = e(g,g)^{bk/b} = e(g, g)^k$, then c is a proper encryption of m; otherwise, it is an encryption of some other message $m' \neq m$. Thus, an adversary that can break the above decisional assumption can easily be made into an adversary that breaks the semantic security of this scheme. Recently, the above assumption was proven hard in the generic group model by Dodis and Yampolskiy.

However, the security of the above scheme also appears to rely on the assumption that given $(g, g^a)$, the value a cannot be derived from seeing the a-th root of a polynomial set of random values. Although this assumption seems plausible in a group of prime order, by making few alterations to this core idea a solution is provided which makes fewer (and more standard) assumptions.

A second method for performing unidirectional proxy re-encryption includes certain global system parameters (g,Z) that remain unchanged.

Key Generation (KG). A user's key pair is of the form $pk_a = (Z^{a_1}, g^{a_2})$ and $sk_a = (a_1, a_2)$ A user can encrypt, sign, and delegate decryption rights all under $z^{a_1}$; if the value $g^{a_1}$ is present, it signifies that the user is willing to accept delegations.

Re-Encryption Key Generation (RG). A user A delegates to B publishing the re-encryption key $rkA<B = g^{a_1 2} \in G_1$, computed from B's public information.

First-Level Encryption ($E_1$). To encrypt a message $m \in G_2$ under $pk_a$ in such a way that it can only be decrypted by the holder of $sk_a$, output $c_{a,1} = (Z^{1k}, mZ^k)$ (to achieve proxy invisibility output $C_{a,2} = (Z^{a_2 k}, mZ^k)$).

Second-Level Encryption ($E_2$). To encrypt a message $m \in G_2$ under $pk_a$ in such a way that it can be decrypted by A and her delegatees, output $c_{a,r} = (g^k, mZ^{a_i k})$.

Re-Encryption (R). Anyone can change a second-level ciphertext for A into a first-level ciphertext for B with $rk_{A \rightarrow B} = g^{a_1 b_2}$. From $c_{a,r} = (g^k, mZ^{a_1 k})$, compute $e(g^k, g^{a_1 b_2}) = Z^{b_2 a_1 k}$ and publish $C_{b,2} = (Z^{b_2 a_1 k}, mZ^{a_1 k}) = (Zb_2 k', mZ^{k'})$.

Decryption ($D_1, D_2$). To decrypt a first-level ciphertext $c_{a,i} = (\alpha, \beta)$ with secret key $a_i \in sk_a$, compute $m = \beta/\alpha^{1/a_i}$ for $i \in \{1,2\}$. To decrypt a second-level ciphertext $c_a = (\alpha, \beta)$ with secret key $a_i \in sk_a$, compute $m = \beta/e(\alpha, g)^{a_i}$.

This scheme is similar to the previous one, except to accept delegations, a user must store two secret keys. If Bob and the proxy collude, they cannot decrypt first-level encryptions intended for Alice. Indeed, they can recover only the weak secret $g^{a_i}$ that can only be used to decrypt second-level encryptions (which Bob and the proxy can already open anyway).

As in the previous scheme, both encryption and decryption operations are similar to those of plain Elamal, thus very efficient, while the pairing computation is performed only by the proxy. The security of this scheme relies on an extension of the decisional bilinear Diffie-Hellman (DBDH) assumption; the proof of Boneh and Franklin that the DBDH problem is hard in generic groups, in the sense of Shoup, can be easily extended to this problem, when recalled that the additional parameter $e(g,g)^{bc_2}$ is represented as a random string in the range of the mapping. When no delegations are made, original first-level ciphertexts of the form $(Z^{a_1 k}, mZ^k)$ are exactly like Elgamal and thus their external security only depends on DDH in $G_2$ The above scheme is correct and secure assuming the extended Decisional Bilinear Diffie Hellman (eDBDH) that for random $g \leftarrow G_1$, a, b, $c \leftarrow Z_q$, and $Q \in G_2$, given $(g, g^a, g^b, g^c, e(g,g)^{bc_2}, Q)$ it is hard to decide if $Q = e(g,g)^{abc}$ (standard security) and the discrete logarithm assumption (master secret security).

More precisely, and adversary that can break the standard security of this scheme with probability (½+g) can be used to break the eDBDH problem in ($G_1, G_2$) with probability (½+ε/2). Any adversary that can break the master secret security of this scheme with probability $\epsilon$ can be used to break the discrete logarithm problem in $G_1$ with probability $\epsilon$.

The security definition quantifies over all encryption algorithms $E_i \in \vec{E}$; in this case, we have two algorithms $E_1$, $E_2$, where and $E_1$ ciphertext takes the form $(Z^{a_1k}, mZ^k)$. This construction is equivalent to that of the form $(Z^k, m Z^{a_1k})$. Now, it is clear if the $E_2$ ciphertext of the form $(g^k, m Z^{a_1k})$ is secure, then so are the $E_1$ versions, since $E_2$ ciphertexts reveal strictly more information (i.e., $g^k \in G_1$). Thus, it suffices to argue the security of the $E_2$ ciphertexts only.

Suppose A distinguishes encryptions of $E_2$ with non-negligible probability, we simulate an adversary S that decides eDBDH as follows.

1. One eDBDH input $(y, y^a, y^b, y^c, e(y,y)^{bc^2}, e(y,y)^d)$, the simulator sets up a proxy re-encryption world for the adversary A with the goal of using A to decide if d=abc or not. To begin, the simulator outputs the global parameters for the system $(g, Z)$. Here, for reasons we will later see, the simulator sets $g=y^c$, $Z=e(g,g)=e(y)^{c_2}$. Next, the simulator sends to adversary A the target public key $pk_B=(e(y,y)^{bc_2}=Z^b,(y^c)^t=g^t)$ where t is randomly selected from $Z_q$ by the simulator. Thus, we can think of (b, t) as the secret key of the target user.

2. Next, for i=1 up to poly (k), A can request:

(a) $rk_{x \to B}$, a deleation to B from a party corrupted by A. A can generate these delegations for as many corrupted users as it liked by internally running $(pk_x,sk_x) \leftarrow KG(1^k)$ and computing $rk_{x \to B}=(g^{t_1})^{sk_{(x,1)}}$, where $sk_x=(sk_{(x,1)}, sk_{(x,2)})$.

(b) $rk_{B \to h}$, a delegation from B to an honest party. The simulator randomly selects two values $r_{(h,1)},r_{(h,2)} \leftarrow Z_q$, sets $rk_{B \to h}=(y^b)^{r_{(h,2)}}=g^{b(r_{(h,2)}/c)}$ and $pk_h=(Z^{r_{(h,1)}},y^{(h,2)}=g^{r_{(h,2)}/c})$, and sends $(pk_h,rk_{B \to h})$ to A. The corresponding secret key is $sk_h=(r_{(h,1)},(r_{(h,2)}/c))$.

(c) $rk_{h \to B}$, a delegation to B from an honest party h. The simulator uses either the recorded value $r_{(h,1)}$ from the previous step if the honest party already exists, or generates fresh random values for a new party, and computes $rk_{h \to B}=(g^t)^{r_{(h,1)}}$.

3. Eventually, A must output a challenge $(m_0, m_1, \tau)$, where $m_0 \neq m_1 \in M$ and $\tau$ is its internal state information. The simulator randomly selects $s \in \{0,1\}$, computes the ciphertext $c_s=(y^a, m_s e(y,y)^d=(g^{a/c}, m_s e(g,g)^{d/c^2})$, sends $(c_s, \tau)$, to A, and waits for A to outputs, $s^1 \in \{0,1\}$.

4. If $s=s^1$, then S guesses "d=abc"; otherwise S guesses "d≠abc".

First, it can be observed that if d=abc, then the simulation is perfect; that is, the ciphertext output is of the proper form $(g^{a/c}, m_b Z^{(abc)c^2}=m_b Z^{b(a/c)})$ for the user with $sk_{(B,1)}=b$. if d≠abc, then $m_b$ is information-theoretically hidden from A, since d was chosen independently of a,b,c. Thus, if A succeeds with probability ½+$\epsilon$, then S succeeds with probability (½+$\epsilon$) (when d=abc) and probability exactly ½ (when d≠abc), for an overall success probability of (½+$\epsilon$/2). This contradicts the eDBDH assumption when $\epsilon$ in non-negligible.

Regarding master secret security, suppose an adversary A can recover the secret key of a targeted user B (i.e., $sk_B=(sk_{(B,1)}, sk_{(B,2)})$) with non-negligible probability $\epsilon$ by interacting with B, then an adversary S can be built that takes discrete logs in $G_1$ with probability $\epsilon$. Recovering only the value $sk_{(B,1)}$ (which is arguably the most valuable of the two). Simulator S works as follows:

1. On input$(g,g^a)$ in $G_1$, output the global parameters $(g, Z=e(g,g))$ and the target public key $pk_B=(e(g,g^a), g^{sk_{(B,2)}})$ where $Sk_{(B,2)}$ is chosen at random from $Z_q$. One can think of $sk_{(B,1)}=a$.

2. Next, for i=1 up to poly (k), A can request.

(a) $rk_{B \to x}$, a delegation from B to a party corrupted by A. S randomly selects $r_{x,1)}, r_{x,2)} \leftarrow Z_q$, sets $rk_{B \to x} \leftarrow g^{ar_{(x,2)}}$, $pk_x=(Z^{r_{(x,1)}},g^{r_{(x,2)}}$ and $sk_x=(r_{(x,1)}, r_{(x,2)})$, and sends $(pk_x, sk_x, rk_{B \to x})$ to A.

(b) $rk_{x \to B}$, a delegation to B from a party corrupted by A. A can generate these delegations internally by running $(pk_x, sk_x) \leftarrow KG (1^k)$ and computing $rk_{x \to B}=g^{sk_{(x,1)}}$.

3. Eventually, A must output a purported secret key for B of the form $(\alpha, \beta)$. The simulator returns the value $\alpha$.

The simulation is perfect; thus A must not be able to recover the master secret key of B, despite accepting and providing numerous delegations to B, because otherwise, S can efficiently solve the discrete logarithm problem in GI.

A temporary unidirectional proxy re-encryption will now be discussed. In addition, to the global parameters $(g, Z)$, suppose there is a trusted server that broadcasts a random value $h_i \in G_1$ for each time period $i \geq 1$ for all users to see. Let $Z_i=e(g, h_i) \in G_2$. Alice is able to delegate to Bob only for time period i, say, while she is on vacation, as follows.

Key Generation (KG). A user's key pair is of the form $pk_a=(g^{a_0},g^{a_r}, sk_a=(a_0,a_r)$, plus a temporary secret $a_i$, for time period i which will be generated in RG.

Re-Encryption Key Generation (RG). A user A publicly delegates to B during time period i as follows: (1) B chooses and stores a random value $b_i \in Z_q$, and publishes $h_i^{b_i}$; then, (2) A computes and publishes $rk^i_{A \to B}=h_i^{a_r b_i/a_0}$.

First-Level Encryption ($E_1$). To encrypt $m \in G_2$ under $pk_a$ during time period i in such a way that it can only be decrypted by A, compute $Z_i^{a_r k}=e(g^{a_r},h_i)^k$ and output $c_{a,r}=Z_i^{a_r k}, m Z_i^k$.

Second-Level Encryption ($E_2$). To encrypt $m \in G_2$ under $pk_a$ during time period i in such a way that it can be decrypted by A and her delegatees, compute $Z_i^{a,k}=e(g^{a_r}, h_i^k$ and output $c_{a,i}=g^{a_0 k}, m Z_i^{a,k}$.

Re-Encryption (R). Anyone can change a second-level ciphertext for A into a first-level ciphertext for B with $rk^i_{A \to B,i}=h_i^{a_r b_i/a_0}$. From $c_{a,i}=(g^{a_0 k},mZ_i^{a,k})$, compute $Z_i^{b;a,k}=e(g^{a_0 k}, rk_{A \to B})$ and publish $C_{b,i}=(Z_i^{b;a,k},k,mZ_i^{a,k})=(Z_i^{bk'}, mZ_i^{k'})$. Decryption $(D_1,D_2)$. To decrypt a first-level ciphertext $C_{a,i}=(\alpha,\beta)$ with secret key secret key $a_i \in \{a_r, a_1, a_2, \ldots\}$ (corresponding to a re-encryption from the jth time period or a first-level original ciphertext with permanent key $a_r$), compute $m=\beta/\alpha^{1/a_i}$. To decrypt a second-level ciphertext $c_a=(\alpha, \beta)$ with secret key $(a_0,a_r)$ compute $m=\beta^{a_0}/e(\alpha,h_i)^{a_r}$.

A single global change can invalidate all previous delegations without any user needing to change their public key. P The above scheme is correct and secure assuming the Decisional Bilinear Diffie-Hellman (DBDH) that for random $g \leftarrow G_1 a,b,c, \leftarrow Z_q$, and $Q \in G_2$ given $(g, g^a, g^b, g^c, Q)$ it is hard to decide if $Q=e(g,g)^{abc}$ (standard security) and the discrete logarithm assumption (master secret security).

More precisely, let T be the maximum number of time steps. Any adversary that can break the standard security of this scheme with probability (½+$\epsilon$) can be used to break the DBDH problem in $(G_1, G_2)$ with probability (½+$\epsilon$/(2T)). Any adversary that can break the master secret security of this scheme with probability $\epsilon$ can be used to break the discrete logarithm problem in $G_1$ with probability $\epsilon$.

The present security definition quantifies over all encryption algorithms $E_i - \vec{E}$; in this case, there are two algorithms $E_1$, $E_2$, which produce different types of ciphertext. Both styles of ciphertext will now be addressed.

Regarding standard security, let T be the maximum number of time periods. Suppose A distinguishes $E_1$ ciphertext with non-negligible probability ($E_2$ will be addressed shortly) an adversary S is simulated that decides DBDH as follows.

1. On input $(g,g^a,g^b,g^c, Z^d)$, the simulator sends A the global parameters $(g,e(g,g)=Z)$ and the target public key $pk_B=(g^t, g^a)$, where t is randomly selected from Zq, and the corresponding secret key is $sk_B=(t,a)$. The simulator also honestly generates and publishes the public keys of all other parties.

2. For j=1 up to T time periods, the simulator publishes the public delegation parameter for that time period $h_j=g^{x_j}$, where $x_j$ is randomly selected from Zq. The simulator also publishes the delegation acceptance value $D_{(U,j)}=h_j^{z_{(U,j)}}$ for all users U, including B, where $z_{(U,j)}$ is randomly selected from $Z_q$.

(a) Next, for i=1 up to poly (k), A can request.

(i) $rk_{x \to B}$, a delegation to B from a party corrupted by A. A can generate these delegations internally by running $(pk_x, sk_x) \leftarrow KG(1^k)$ where $sk_x=(sk_{(x,0)}, sk_{(x,r)})$, and computing.

(ii) $rk_{B \to h}$, a delegation from B to an honest party h with delegation acceptance value $D_{(h,j)}$ for time period j. S computes and sends $$rk_{B \to h} \leftarrow (g^a)^{x_j z(h,j)/t} = D_{(h,j)}^{a/t} \text{ to } A.$$

(iii) $rk_{h \to B}$, a delegation to B from an honest party h with secret key $sk_h=(sk_{(h,0)}, sk_{(h,r)})$. S trivially computes $$rk_{h \to B} = D_{B,j}^{sk(h,r)/sk(h,0)}.$$

3. Eventually, during the last time period, A must output a challenge $(m_0, m_1, \tau)$, where $m_0 \neq m_1 \in M$ and $\tau$ is its internal state information. The simulator randomly selects $s \in \{0,1\}$, computes the ciphertext $c_s=(Z^d, e(g^b, g^c)m_s)$, sends $(c_s, \tau)$ to A, and waits for A to output $s' \in \{0,1\}$.

4. If s=s', then S guesses "d=abc", otherwise S guesses "d≠abc".

First, it can be observer that if d=abc, then the simulation is perfect; that is, the ciphertext output is of the proper form $(Z^{abc}, Z^{bc}m_s)$ for the user with $sk_{(B,r)}=a$. However, if d≠abc, then $m_s$ is information-theoretically hidden from A. Thus, if A succeeds with probability ½+ϵ at distinguishing $E_1$ ciphertexts, then S succeeds with probability (½+ϵ) (when d=abc) and probability exactly ½ (when d≠abc), for an overall probability of (½+2/ϵ). This contradicts the DBDH assumption when ϵ is non-negligible.

Now, suppose that A distinguishes $E_2$ ciphertexts with non-negligible probability, a different adversary S can be simulated that decides DBDH as follows:

1. On input $(g,g^a,g^b,g^c,Z^d)$, the simulator sends A the global parameters $(y=g^c, e(y,y)=e(g,g)^{c^2})$ and the target public key $pk_B=(y^{1/c}=g, y^{a/c}=g^{a/c})$ and the corresponding secret key is $sk_B=(1/c, a/c)$. The simulator also honestly generates and publishes the public keys of all other parties.

2. For j=1 up to T time periods, the simulator publishes the public delegation parameter for that time period $hj=y^{x_j}=(g^c)^{x_j}$, where $X_j$ is randomly selected from Zq. The simulator also publishes the delegation acceptance value $D_{(U,j)}=k_j^{z(U,j)/c}=g^{x_j z(U,j)}$ for all users U, including B, where $z_{(U,j)}$ is randomly selected from Zq. The simulator pretends to give the temporary secret $z_{(U,j)}/c$ to each honest party (it cannot actually do so, since it does not know the value 1/c). These acceptance values are generated without the 1/c term for all corrupted users.

(a) Next, for i=1 up to poly (k), A can request:

i. $rk_{X \to B}$, a delegation to B from a party corrupted by A. A can generate these delegations internally by running $(pk_x, sk_x) \leftarrow KG(1^k)$, where $sk_x=(sk_{(x,0)}, sk_{(x,r)})$, and computing $$rk_{x \to B} = D_{(B,j)}^{sk(x,r)/sk(x,0)}.$$

ii. $rk_{B \to h}$, a delegation from B to an honest party h with delegation acceptance value D(hj) for time period j. S computes and sends $$rk_{B \to h} = D_{(h,j)}^{sk(B,r)/sk(B,0)} = y^{x_j z(h,j)(a/c)/(1/c)} = (g^a)^{x_j z(h,j)}$$

iii. $rk_{h \to B}$, a delegation to B from an honest party h. S computes and sends $$rk_{x \to B} = D_{(B,j)}^{sk(h,r)/sk(h,0)} \text{ to } A.$$

3. Eventually, during the last time period, A must output a challenge $(m_0, m_1, \tau)$, where $m_0 \neq m_1 \in M$ and $\tau$ is its internal state information. The simulator randomly selects $s \in \{0,1\}$, computes the ciphertext $c_s=(g^b, m_s)(Z^d)^{x_j}=(y^{b/c}, m, e(y,h_j)^{d/c^2})$, sends $(c_s, \tau)$ to A, and waits for A to output $s' \in \{0,1\}$.

4. If s=s' then S guesses "d=abc", otherwise S guesses "d≠abc".

Now, it can be observed that if d=abc, then the simulation is perfect; that is, the challenge ciphertext is of the proper form $(y^{sk(B,0)b}, m_s e(y,h_j)^{sk(B,r)b})$. However, if d≠abc, then $m_s$ is information-theoretically hidden from A. Thus, if A succeeds with probability ½+ϵ at distinguishing $E_2$ ciphertexts, then S succeeds with probability (½+ϵ) (when d=abc) and probability exactly ½ (when d≠abc), for an overall probability of (½+2/ϵ). This contradicts the DBDH assumption when s is non-negligible.

Regarding master secret security, let T be the maximum number of time periods. Suppose an adversary A can recover the secret key of a targeted user B (i.e., $sk_B=(sk_{(B,1)}, sk_{(B,2)})$) with non-negligible probability by interacting with B, then an adversary S can be built that takes discrete logs in $G_1$. For recovering only the value $sk_{(B,2)}$ the simulator S works as follows:

1. On input $(g,g^a)$ in $G_1$, output the global parameters $(g,Z=e(g,g))$ and the target public key $pk_b=(g^{sk(B,0)}, g^a)$, where $sk_{(B,0)}$ is chosen randomly from Zq and $sk_{(B,r)}=a$.

2. For j=1 up to T time periods, the simulator publishes the public delegation parameter for that time period $h_j=g^{x_j}$, where $x_j$ is randomly selected from Zq. The simulator also publishes the delegation acceptance value $h_j^{z(U,j)}$ for all users U, including B, where $z_{(U,j)}$ is randomly selected from Zq.

3. Next, for i=1 up to poly(k), A can request:

(a) $rk_{B \to U}$, a delegation from B to a party corrupted by A. Let j be the current time period. S sets $$rk_{B \to U} = (g^a)^{x_j z(U,j)/sk(B,0)} = h_j^{az(U,j)/sk(B,0)} = h_j^{sk(B,r)z(U,j)/sk(B,0)}.$$

(b) $rk_{U \to B}$, a delegation to B from a party corrupted by A. A can generate these delegations internally using the public information of B.

4. Eventually, A must output a purported secret key for B of the form $(\alpha,\beta)$. The simulator returns the value $\beta$.

The simulation is perfect; thus A must not be able to recover the master secret key of B, despite accepting and providing numerous delegations to B, because otherwise, S can efficiently solve the discrete logarithm problem in $G_1$.

A flow chart of particular embodiments of the presently disclosed methods are depicted in FIGS. 3A through 5B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 3A:
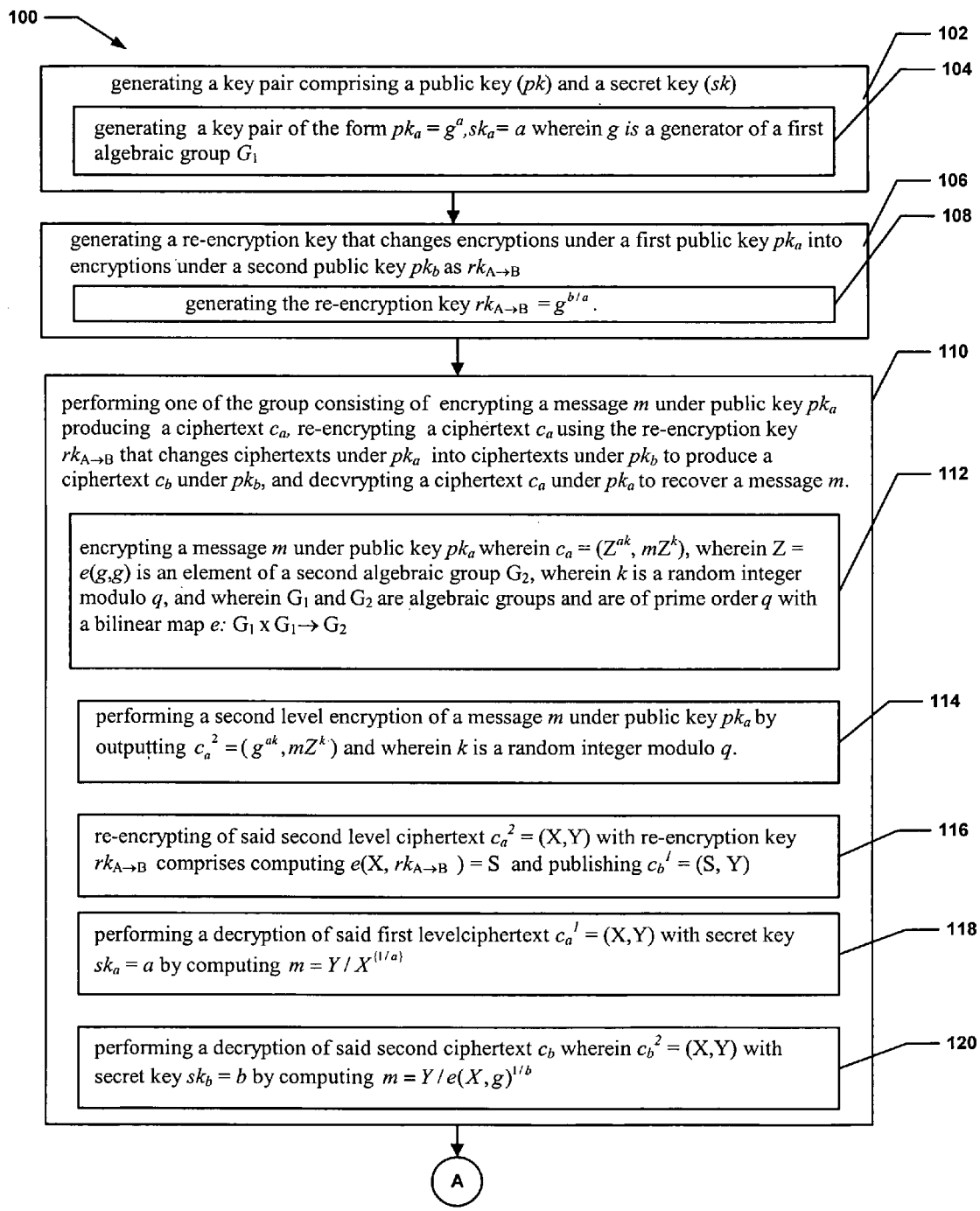
FIGS. 3A and 3B comprise a flow diagram of a first method of performing unidirectional proxy re-encryption.
Figure 3B:
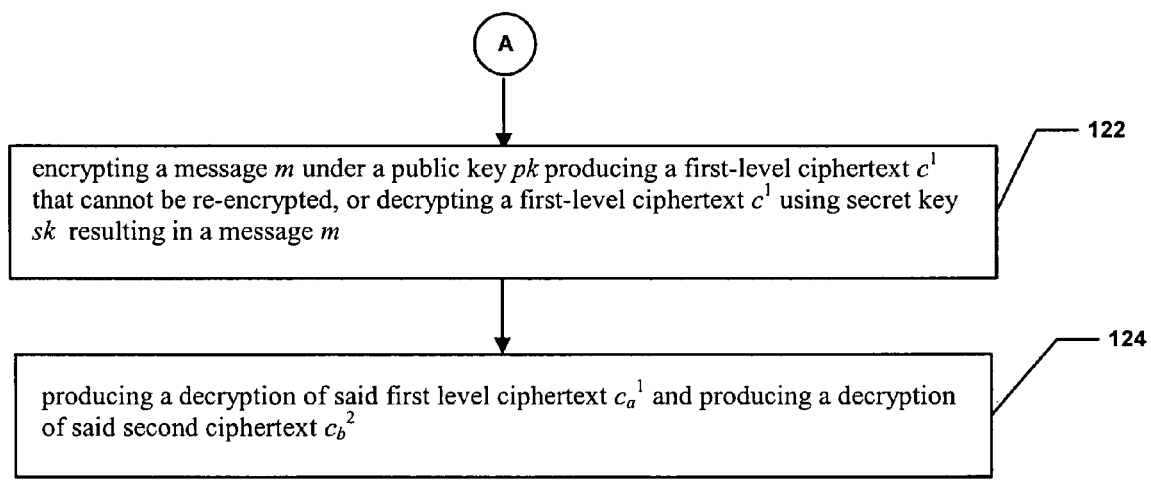

Referring now to FIGS. 3A and 3B, a particular embodiment of a first method 100 of performing unidirectional proxy re-encryption is depicted. The method begins with processing block 102 which recites generating a first key pair comprising a public key (pk) and a secret key (sk). Processing block 104 recites generating a key pair of the form $pk_a=sk_a=a$ wherein g is a generator of a first algebraic group $G_1$.

Processing continues at processing block 106 which recites generating a re-encryption key that changes encryptions under a first public key $pk_a$ into encryptions under a second public key $pk_b$ as $rk_{A \to B}$. Processing block 108 discloses generating the re-encryption key $rk_{A \to B}=g^{b/a}$.

Processing block 110 states performing one of the group consisting of encrypting a message m under public key $pk_a$ producing a ciphertext $c_a$, re-encrypting a ciphertext $c_a$ using the re-encryption key $rk_{A \to B}$ that changes ciphertexts under $pk_a$ into ciphertexts under $pk_b$ to produce a ciphertext $c_b$ under $pk_b$, and decrypting a ciphertext $c_a$ under $pk_a$ to recover a message m. As recited in processing block 112, encrypting of a message m comprises performing a first level encryption of a message m under public key $pk_a$ wherein $c_a=(Z^{ak}, mZ^k)$, wherein $Z=e(g,g)$ is an element of a second algebraic group $G_2$, wherein k is a random integer modulo q, and wherein $G_1$ and $G_2$ are algebraic groups and are of prime order q with a bilinear map e: $G_1 \times \hat{G}_1 \to G_2$. As further recited at processing block 114 performing a second level encryption of a message m under public key $pk_a$ by outputting $C_a^2=(g^{ak}, mZk)$ and wherein k is a random integer modulo q.

Processing continues at processing block 116 which discloses said re-encrypting of said second level ciphertext $c_a^2=(X,Y)$ with re-encryption key $rk_{A \to B}$ comprises computing $e(X, rk_{A \to B})=S$ and publishing $c_b^1=(S,Y)$. Processing block 118 recites performing a decryption of said first level ciphertext $C_a^1=(X,Y)$ with secret key $sk_a=a$ by computing $m=Y/X^{\{1/a\}}$. Processing continues with processing block 120 said performing a decryption of said second ciphertext $c_b$ wherein $C_b^2=(X,Y)$ with secret key $sk_b=b$ by computing $m=Y/e(X,g)^{1/b}$.

Processing block 122 discloses performing at least one of the group consisting of encrypting a message m under a public key pk producing a first-level ciphertext $c^1$ that cannot be re-encrypted, and decrypting a first-level ciphertext $c^1$ using secret key sk resulting in a message m. Processing block 124 recites performing at least one of the group consisting of producing a decryption of said first level ciphertext $c_a^1$ and producing a decryption of said second ciphertext $C_b^2$.

Figure 4A:
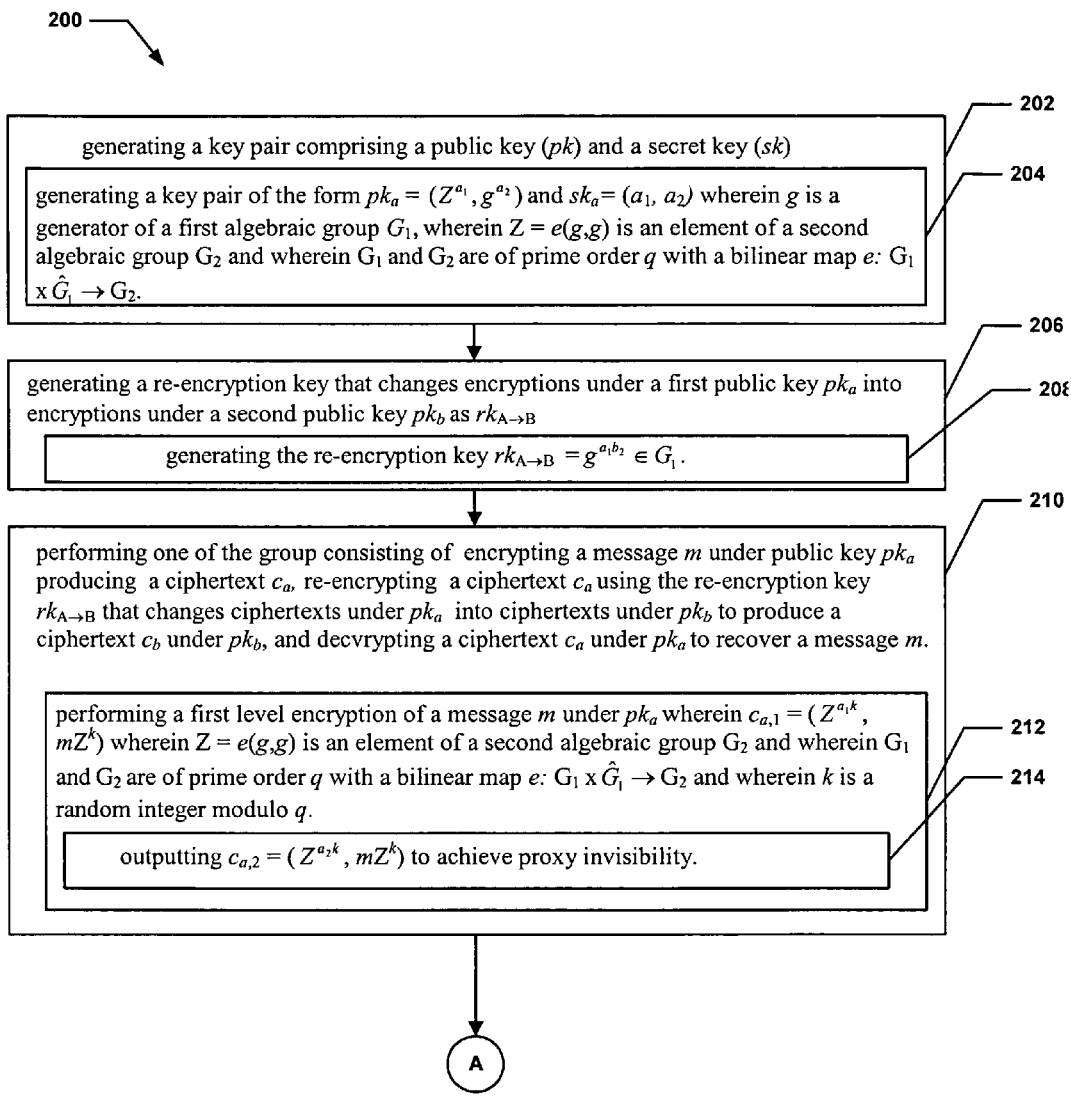
FIGS. 4A and 4B comprise a flow diagram of a second method of performing unidirectional proxy re-encryption.
Figure 4B:
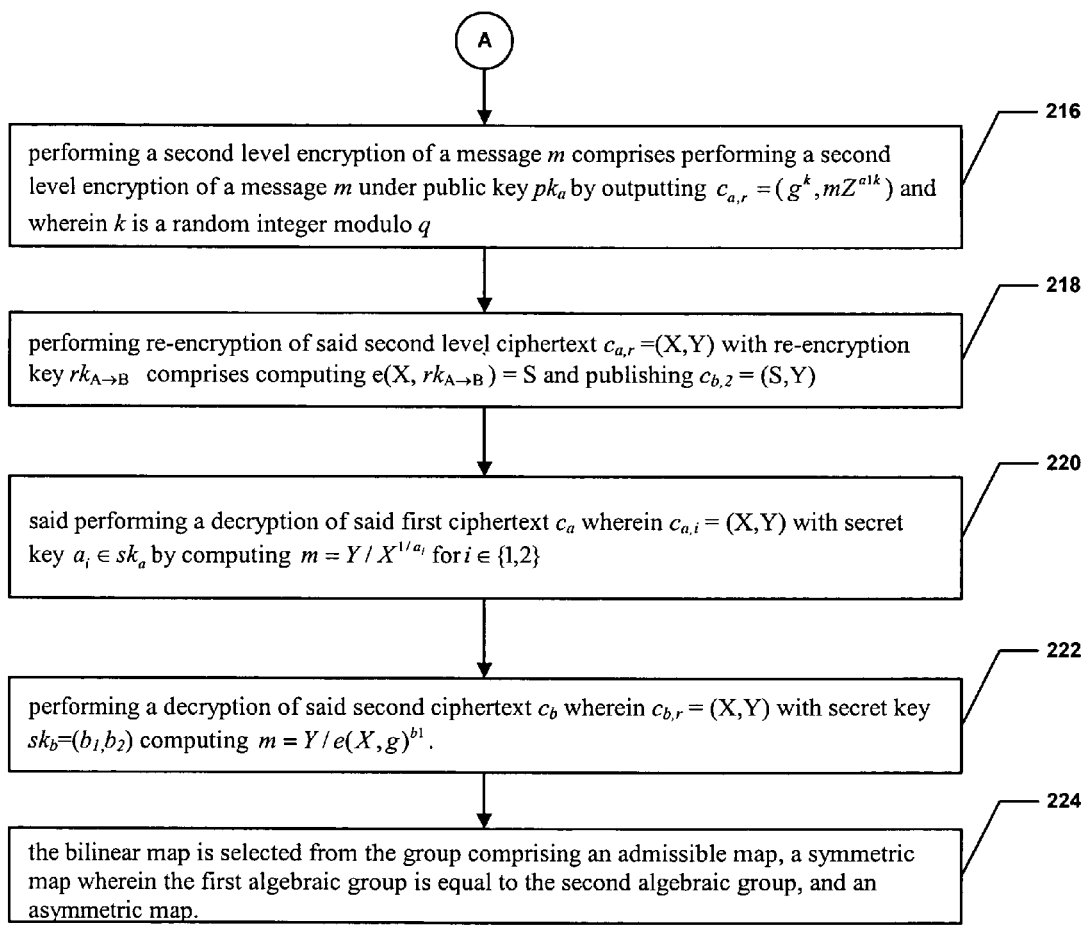

Referring now to FIGS. 4A and 4B, a particular embodiment of a second method 200 of performing unidirectional proxy re-encryption is depicted. This method begins with processing block 202 which recites generating a first key pair comprising a public key (pk) and a secret key (sk). Processing block 204 discloses generating a key pair of the form $pk_a=(Z^{a_1}, g^{a_2})$ and $sk_a=(a_1, a_2)$ wherein g is a generator of a first algebraic group $G_1$, wherein $Z=e(g,g)$ is an element of a second algebraic group $G_2$ and wherein $G_1$ and $G_2$ are of prime order q with a bilinear map e: $G_1 \times \hat{G}_1 \to G_2$.

Processing continues at processing block 206 which recites generating a re-encryption key that changes encryptions under a first public key $pk_a$ into encryptions under a second public key $pk_b$ as $rk_{A \to B}$. Processing block 208 discloses generating the re-encryption key $rk_{A \to B}$ comprises generating the re-encryption key $rk_{A \to B}=g^{a_1 b_2} \in G_1$.

Processing block 210 states performing one of the group consisting of encrypting a message m under public key $pk_a$ producing a ciphertext $c_a$, re-encrypting a ciphertext $c_a$ using the re-encryption key $rk_{A \to B}$ that changes ciphertexts under $pk_a$ into ciphertexts under $pk_b$ to produce a ciphertext $c_b$ under $pk_b$, and decrypting a ciphertext $c_a$ under $pk_a$ to recover a message m. As recited in processing block 212 performing a first level encryption of a message m under $pk_a$ wherein $C_{a,1}=(Z^{a_1 k}, mZ^k)$ wherein $Z=e(g,g)$ is an element of a second algebraic group $G_2$ and wherein $G_1$ and $G_2$ are of prime order q with a bilinear map e: $G_1 \times \hat{G}_1 \to G_2$ and wherein k is a random integer modulo q. As further recited at processing block 214 performing a first level encryption comprises outputting $C_{a,2}=(Z^{a_2 k}, mZ^k)$ to achieve proxy invisibility.

As disclosed in processing block 216 performing a second level encryption of a message m comprises performing a second level encryption of a message m under public key $pk_a$ by outputting $c_{a,r}=(g^k, mZ^{a_1 k})$ and wherein k is a random integer modulo q.

Processing continues at processing block 218 which discloses performing re-encryption of said second level-ciphertext $C_{a,r}=(X,Y)$ with re-encryption key $rk_{A \to B}$ comprises computing $e(X, rk_{A \to B})=S$ and publishing $C_{b,2}=(S,Y)$. Processing block 220 recites performing a decryption of said first ciphertext $c_a$ wherein $c_{a,i}=(X,Y)$ with secret key $a_i \in sk_a$ by computing $m=Y/X^{1/a_i}$ for $i \in \{1,2\}$.

Processing continues with processing block 222 which states performing a decryption of said second ciphertext $C_b$ wherein $c_{b,r}=(X,Y)$ with secret key $sk_b=(b_1,b_2)$ computing $m=Y/e(X,g)^{b_1}$. Processing block 224 discloses the bilinear map is selected from the group comprising an admissible map, a symmetric map wherein the first algebraic group is equal to the second algebraic group, and an asymmetric map.

Figure 5A:
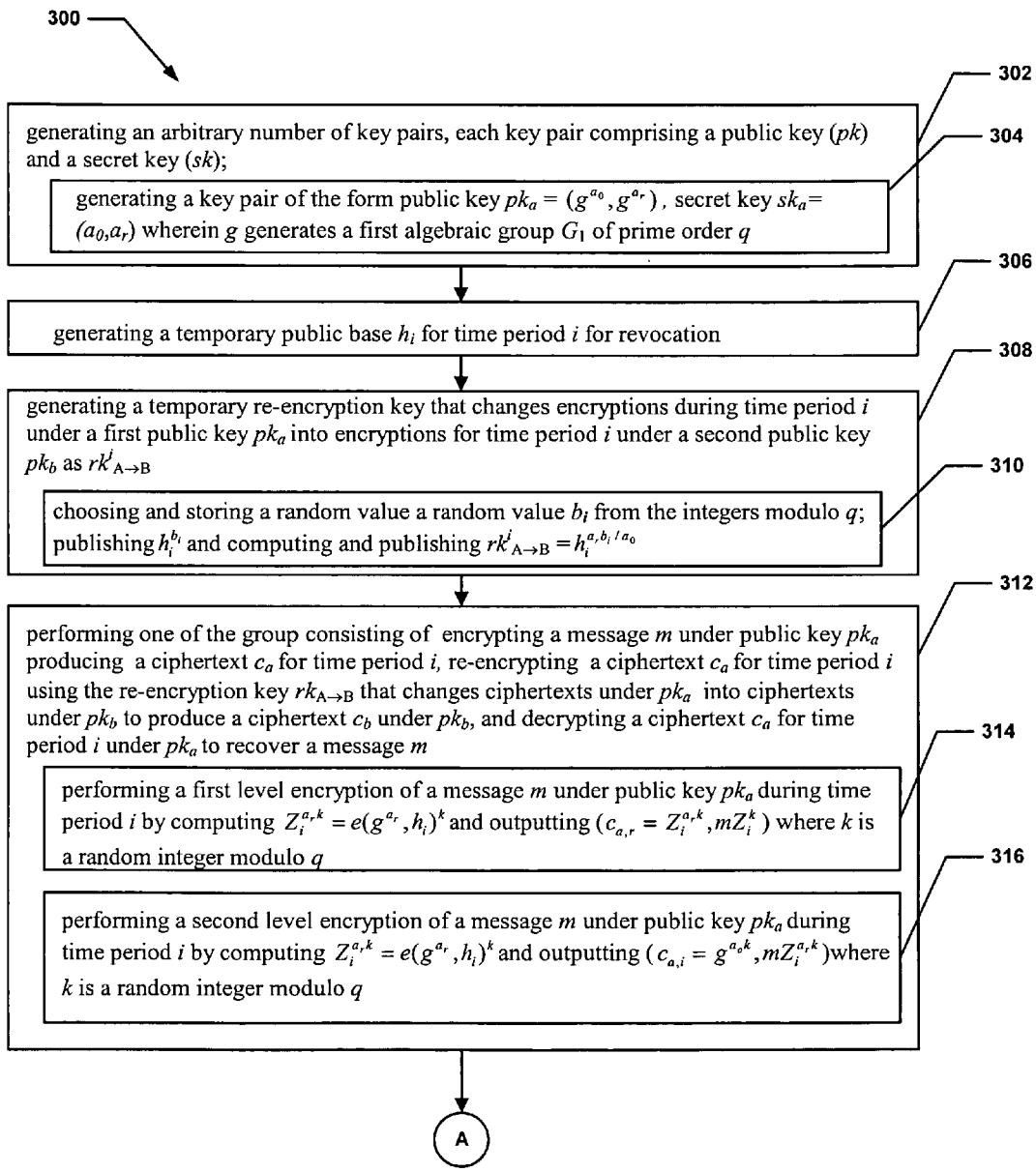
FIGS. 5A and 5B comprise a flow diagram of a method of performing temporary unidirectional proxy re-encryption.
Figure 5B:
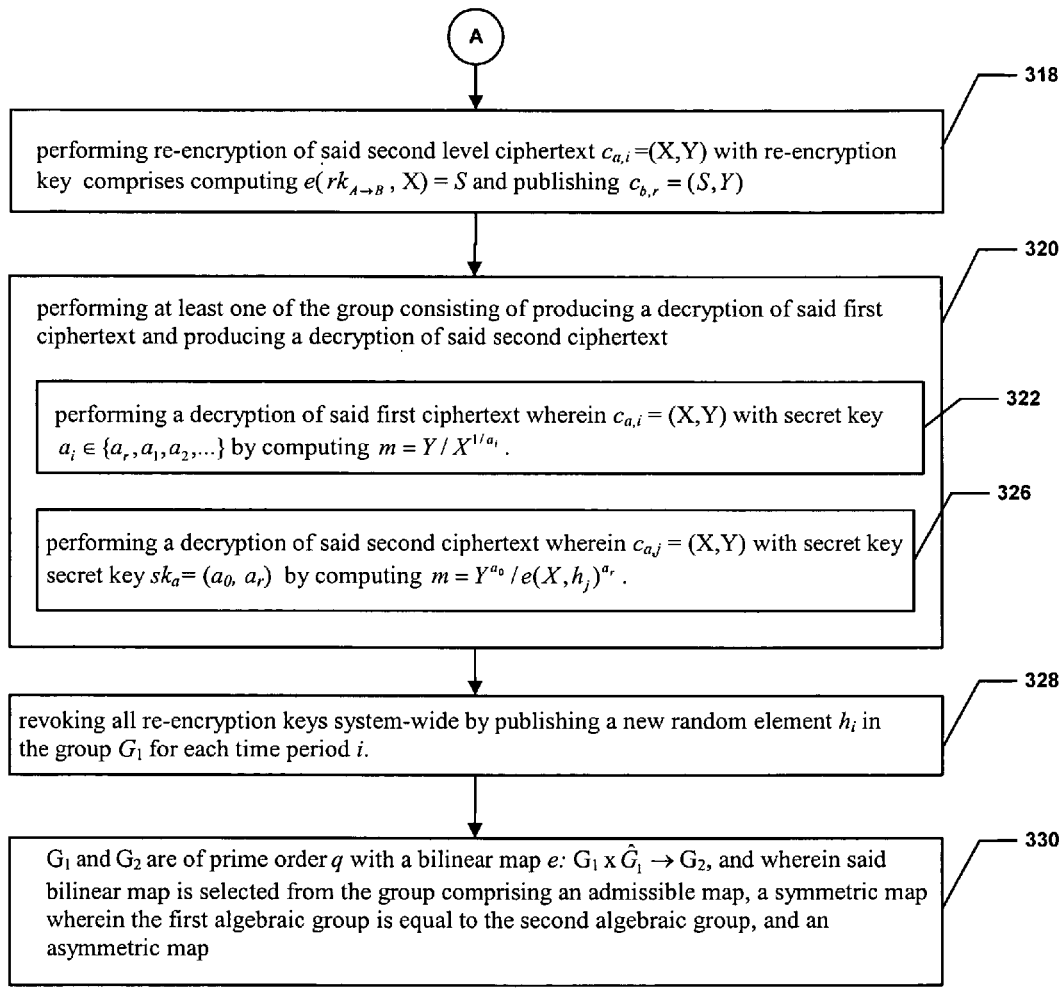

Referring now to FIGS. 5A and 5B, a particular embodiment of a method 300 of performing temporary unidirectional proxy re-encryption is depicted. The method begins with processing block 302 which recites generating an arbitrary number of key pairs, each key pair comprising a public key (pk) and a secret key (sk). Processing block 304 recites generating an arbitrary number of key pairs comprises generating a key pair of the form public key $pk_a=(g^{a_0}, g^{a_r})$, secret key $sk_a=(a_0,a_r)$ wherein g generates a first algebraic group $G_1$ of prime order q.

Processing block 306 recites generating a temporary public base $h_i$ for time period i for revocation. Processing continues at processing block 308 which recites generating a temporary re-encryption key that changes encryptions during time period i under a first public key $pk_a$ into encryptions for time period i under a second public key $pk_b$ as $rk^j_{A \to B}$. As disclosed by processing block 310 this involves choosing and storing a random value a random value $b_i$ from the integers modulo q; publishing $h_i^{b_i}$ and computing and publishing $rk^j_{A \to B} = h_i^{a_r b_i a_0}$.

Processing block 312 states performing one of the group consisting of encrypting a message m under public key $pk_a$ producing a ciphertext $c_a$ for time period i, re-encrypting a ciphertext $c_a$ for time period i using the re-encryption key $rk_{A \to B}$ that changes ciphertexts under $pk_a$ into ciphertexts under $pk_b$ to produce a ciphertext $c_b$ under $pk_b$, and decrypting a ciphertext $c_a$ for time period i under $pk_a$ to recover a message m. As recited in processing block 314, this involves performing a first level encryption of a message m under public key $pk_a$ during time period i by computing $Z_i^{a,k} = e(g^{a_r}, h_i)^k$ and outputting $(C_{a,r} = Z_i^{a,k}, mZ_i^k)$ where k is a random integer modulo q. As further recited at processing block 316 said performing a second level encryption of a message m comprises performing a second level encryption of a message m under public key $pk_a$ during time period i by computing $Z_i^{a,k} = e(g^{a_r}, h_i)^k$ and outputting $(c_{a,i} = g^{a_0 k}, mZ_i^{a,k})$ where k is a random integer modulo q.

Processing continues at processing block 318 which states performing re-encryption of said second level ciphertext $c_{a,i} = (X,Y)$ with re-encryption key comprises computing $e(rk_{A \to B}, X) = S$ and publishing $c_{b,r} = (S,Y)$.

Processing continues with processing block 322 which recites performing a decryption of said first ciphertext wherein $c_{a,i} = (X,Y)$ with secret key $a_i \in \{a_r, a_1, a_2, \ldots\}$ by computing $m = Y/X^{1/a_i}$. Processing block 324 recites said performing a decryption of said second ciphertext wherein $c_{aj} = (X,Y)$ with secret key secret key $sk_a = (a_0, a_r)$ by computing $m = Y_r^{a_0}/e(X, h_j)^{a_r}$.

Processing block 326 discloses comprising revoking all re-encryption keys system-wide by publishing a new random element $h_i$ in the group $G_1$ for each time period i. Processing block 328 states $G_1$ and $G_2$ are of prime order q with a bilinear map $e: G_1 \times \hat{G}_1 \to G_2$, and wherein said bilinear map is selected from the group comprising an admissible map, a symmetric map wherein the first algebraic group is equal to the second algebraic group, and an asymmetric map.

In a particular application, a file system which uses an untrusted access control server to manage access to encrypted files stored on distributed, untrusted block stores is described. Proxy re-encryption is used to allow for access control without granting full decryption rights to the access control server. In this file system, end users on client machines wish to obtain access to integrity-protected, confidential content. A content owner publishes encrypted content in the form of a many-reader, single- writer file system. The owner encrypts blocks of content with unique, symmetric content keys. A content key is then encrypted with an asymmetric master key to form a lockbox. The lockbox resides with the block it protects.

Untrusted block stores make the encrypted content available to everyone. Users download the encrypted content from a block store, then communicate with an access control server to decrypt the lockboxes protecting the content. The content owner selects which users should have access to the content and gives the appropriate delegation rights to the access control server.

An improvement on the access control server model that reduces the server's trust requirements by using proxy cryptography will now be described. In this approach, the content keys used to encrypt files are themselves securely encrypted under a master public key, using a unidirectional proxy re-encryption scheme of the form described in this work. Because the access control server does not possess the corresponding secret key, it cannot be corrupted so as to ain access to the content keys necessary to access encrypted files. The secret master secret key remains offline, in the care of a content owner who uses it only to generate the re-encryption keys used by the access control server. When an authorized user requests access to a file, the access control server uses proxy re-encryption to directly re-encrypt the appropriate content key(s) from the master public key to the user's public key.

This architecture has significant advantages over systems with trusted access control servers. The key material stored on the access control server cannot be used to access stored files, which reduces the need to absolutely trust the server operator, and diminishes the server's value to attackers. The master secret key itself is only required by a content owner when new users are added to the system, and can therefore be stored safely offline where it is less vulnerable to compromise. Finally, the schemes in Section 3 are unidirectional and non-interactive, meaning that users do not need to communicate or reveal their secret keys in order to join the system. This allows content owners to add users to the system without interaction, simply by obtaining their public key. Because this system works with users' long-term keys (rather than generating ephemeral keys for the user), there is an additional incentive for users not to reveal their decryption keys.

The proposed design fundamentally changes the security of an access control server storage system. In this new model, much of the security relies on the strength of a provably-secure cryptosystem, rather than on the trust of a server operator for mediating access control. Because the access control server cannot successfully re-encrypt a file key to a user without possessing a valid delegation key, the access control server cannot be made to divulge file keys to a user who has not been specifically authorized by the Content owner, unless this attacker has previously stolen a legitimate user's secret key.

The proxy re-encryption file system was implemented on top of Chefs, a confidentiality-enabled version of the SFS read-only file system. Chefs is a single-writer, many-reader file system that provides decentralized access control in integrity-protected content distribution. A content owner creates a signed, encrypted database from a directory tree of content. The database is then replicated on untrusted hosts (e.g., volunteers). A client locates a replica, then requests the encrypted blocks. The Chefs architecture was chosen because it allowed experimentation with different granularities of encryption (per-file and per-block) while providing a transparent file system interface.

Chefs tags each content block with a lockbox. In the original Chefs design, the lockbox contains a 128 bit AES key, itself encrypted with a shared group AES key. Chefs assumes an out-of-band mechanism for content owners to distribute group keys to users.

Chefs was modified to include an access control server. Every block in a Chefs database is encrypted with a 128-bit AES content key in CBC mode. Depending on the granularity of the encryption, a content key can be shared across all of the blocks in a particular file, directory or database, or unique keys can be used for each block. Content keys are themselves encrypted under a system master public key. This encryption results in a set of lockboxes stored with the file data, either in file or directory inodes (per-file and per-directory encryption) or within the blocks themselves (per-block encryption). The parameters of the proxy re-encryption scheme causes a sealed lockbox to expand to several hundred bits, even though the underlying plaintext is a 128-bit AES key.

When a client encounters a block for which it does not possess a content key, it asks the access control server to re-encrypt the lockbox from the master key to the client's public key. If the access control server possesses an appropriate re-encryption key from the master key to the client's key, it performs the appropriate proxy re-encryption and returns the resulting ciphertext to the client, which can then decrypt the lockbox under its own secret key.

Each re-encryption call necessarily results in a round-trip network request, in addition to the proxy re-encryption and client-side decryption of the re-encrypted ciphertext. Thus, the choice of encryption granularity greatly affects the number of re-encryption calls made from the client to the access control server, which in turn affects the end-to-end performance of the system.

In implementing a proxy re-encryption file system, two goals were achieved. The first goal was showing that proxy re-encryption could be successfully incorporated into a basic cryptographic file system. The second goal was proving that the additional security semantics provided by a proxy re-encrypting access control server came at an acceptable cost to end-to-end performance. To achieve this second goal, a number of benchmarks were conducted using the proxy-enabled Chefs file system using various granularities of content key usage (per-block and per-file). Along with these experiments, microbenchmarks were conducted of the proxy re-encryption functions used in the implementation, as well as application-level benchmarks measuring file system performance. To provide a standard of comparison, the same experiments were conducted on an unmodified Chefs configuration with no access control server or proxy re-encryption, using only a single preset AES key to secure the contents of the database.

For the purposes of the testing, two machines were used to benchmark the proxy enabled Chefs file system. The client machine consisted of an AMD Athlon 2100+1.8 GHz with 1 Gbyte RAM and an IBM 7200 RPM, 40 Gbyte, Ultra ATA/100 hard drive. The server machine was an Intel Pentium 4 2.8 GHz with 1 Gbyte RAM and a Seagate Barracuda 7200 RPM, 160 Gbyte, Ultra ATA/100 hard drive. Both systems were running Debian testing/unstable with the Linux 2.6.8 kernel. The client and the server were situated in different cities, representing a distributed file system scenario. The round-trip latency between the two machines was measured at 13 msec, and the maximum sustained throughput of the network link at 7 Mbit/sec. The cryptographic primitives for the presently disclosed scheme were implemented using version 4.83 of the MIRACL cryptographic library, which contains efficient implementations of the Tate pairing as well as fast modular exponentiation and point multiplication.

Table 2 presents average times over 100 runs of the cryptographic operations in the bilinear proxy re-encryption scheme. The measurements provide some basis for understanding the impact of the proxy re-encryption on overall file system performance.

These results indicate that re-encryption is the one of the most time consuming operations in our file system. The 1.8 GHz AMD Athlon 2100 performed better than the 2.8 GHz Intel Pentium 4 server in the microbenchmarks. This advantage is attributed to modular arithmetic routines in MIRACL that perform faster on the Athlon. The MIRACL library provides many hints for selecting assembly code optimizations. Because other benchmarks such as the OpenSSL RSA "speed" test run faster on the server, it is suspected that the Intel server would perform better with proper selection of optimizations in MIRACL.

TABLE 2

Average operation times for 100 runs of the presently disclosed proxy re-encryption scheme on a client and server. All operations refer to re-encryptable "second-level" ciphertexts.

| Parameter size | Machine | Encryption | Decryption (by original recipient) | Re-encryption | Decryption (by delegatee) |
| --- | --- | --- | --- | --- | --- |
| 256-bit | client | 3.1 msec | 8.7 msec | 8.6 msec | 1.5 msec |
|  | server | 3.3 msec | 8.8 msec | 8.8 msec | 1.5 msec |
| 512-bit | client | 7.8 msec | 22.5 msec | 22.0 msec | 3.4 msec |
|  | server | 9.3 msec | 26.5 msec | 26.7 msec | 4.1 msec |

Figure 6:
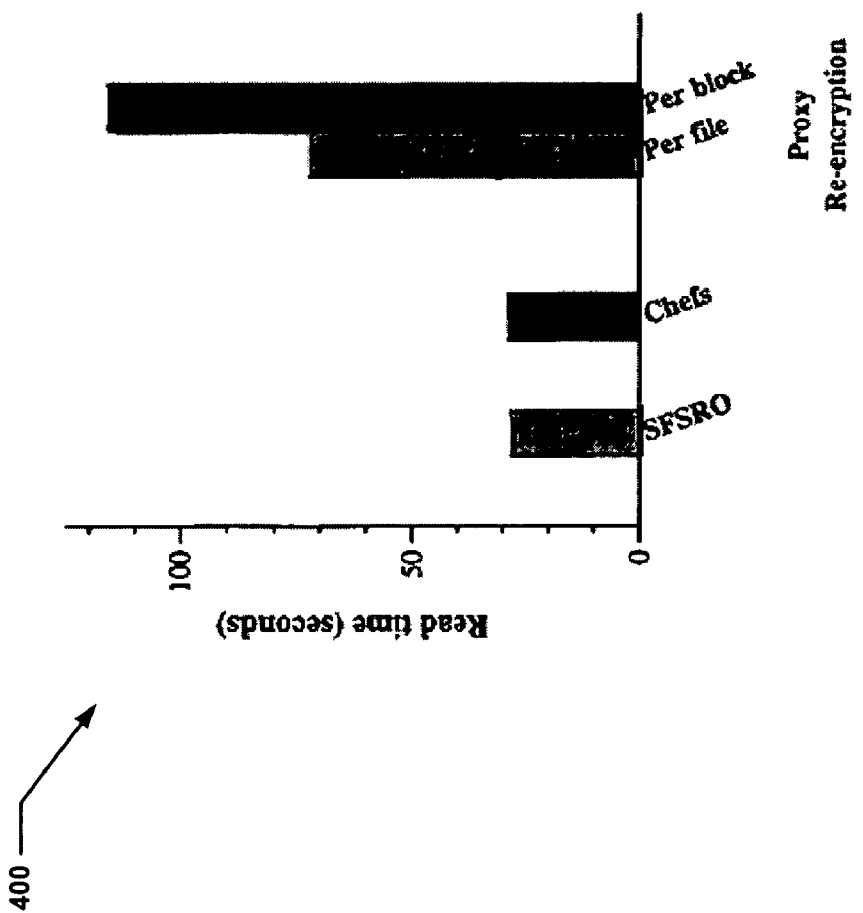
FIG. 6 comprises a graph of small-file benchmarks while performing unidirectional proxy re-encryption.
Figure 7:
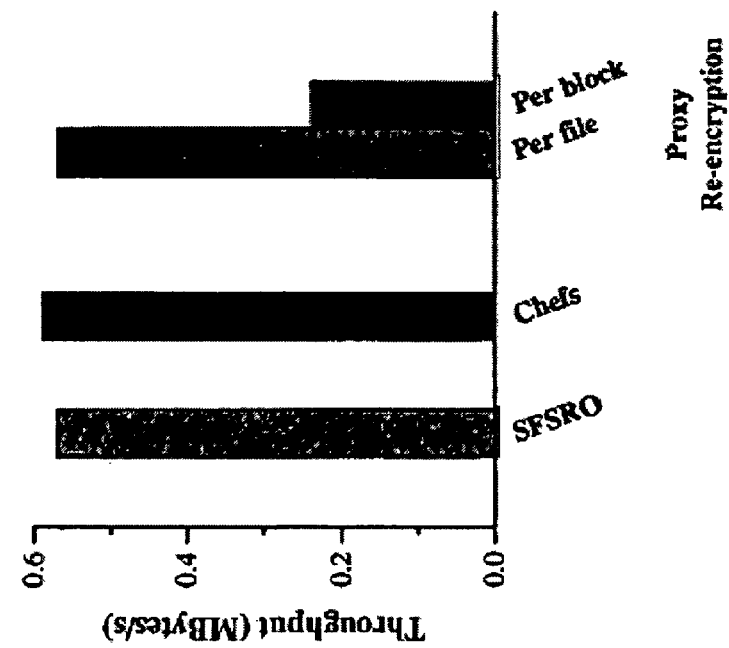
FIG. 7 comprises a graph of large-file benchmarks while performing unidirectional proxy re-encryption.

The remaining benchmarks were conducted using various encryption granularities, including per-block and per-file. For each measurement, the median result of five samples was reported. In all measurements, the server has a warm block cache and the client has a cold block cache. The microbenchmarks, presented in graphs 400 and 402 of FIGS. 6 and 7, include runs of the small-file and large-file test from the LFS suite of file system performance tests. The read phases of the LFS test were used to measure the fundamental performance of our system.

The first test reads several small files. The second test consists of a sequential read of a large file. These two tests capture common workloads in a typical file system. For each of these tests, different encryption granularities were used, including per-block and per-file content keys. The small file benchmark in particular is a worst-case scenario for a proxy-enabled file system, as it requires a large number of lockbox re-encryptions relative to the amount of data read. On the other hand, the large-file workload tends to exhibit exactly the opposite effect, as the ratio of re-encryptions to data read is much smaller. In general, all per- block encryption scenarios tend to be the least efficient (and least practical) when proxy re-encryption is enabled.

Small-file Benchmark. The SFSRO and Chefs benchmarks each generate 2,022 RPCs to fetch content from the block store (1,000 files, 10 directories, and one root directory—each generating two RPCs: one for the node, one for the content).

Note that Chefs adds virtually no discernible overhead, even though the client decrypts every content fetch with 128-bit AES in CBC mode. With the round-trip time accounting for at least 26 seconds of the measurement, the network overshadows the cost of cryptography.

The proxy re-encryption file system first makes 2,022 fetches of content, just like Chefs. With per-file granularity of content keys, the small-file benchmark generates 1,011 re-encryption RPCs. The proxy re-encryption file system takes 44 seconds longer than Chefs. The 44 seconds corresponds exactly to the 13 msec round-trip time, 26.7 msec re-encryption time on the server, and 3.4 msec delegatee decryption time on the client for each of the 1,011 re-encryption RPCs (See Table 2).

With per-block granularity, the small-file benchmark generates 2,022 re-encryption RPCs. A file or directory consists of an node and data block, thus each read now generates two re-encryptions. The proxy re-encryption file system takes 87 seconds longer than Chefs, Because the per-block re-encryption generates twice as many re-encryption RPCs as the per-file scenario, the results concur with our expectations.

Large-file Benchmark. The large-file benchmark generates 5,124 RPCs to fetch 40 Mbytes of content from the block store (two RPCs for the root directory, two for the file, and 5,120 for the file data). In the SFSRO and Chefs experiments, the 7 Mbit bandwidth largely dominates the throughput.

The measurement of Chefs demonstrates that the cost of adding confidentiality to SFSRO comes at no cost to throughput when fetching data across the Internet. Chefs runs slightly faster than SFSRO, initially causing us to question the validity of the measurements. We conducted further measurements to ensure confidence in our results. We verified that both SFSRO and Chefs issue the same type and number of RPCs.

The responses to content fetching RPCs in SFSRO are 8,200 bytes. The responses in Chefs are 8,244 bytes because of PKCS#7 padding overhead with AES-CBC encryption. We suspect that byte alignment and fortuitous interleaving of asynchronous RPCs allowed Chefs to slightly outperform SFSRO. In a run of the large-file benchmark, SFSRO encountered locking contention 16,054 times (when a callback encounters a locked a cache). Chefs encountered only slightly less locking contention—15,981 times.

Because the large-file workload involves only a single file, the per-file proxy re-encryption has no discernible cost. There are a mere two proxy re-encryption RPCs (one for the root, one for the file). The per-block proxy re-encryption generates 5,124 re-encryption RPCs, thus we expect a significant degradation of throughput because of the 13 msec network round-trip time.

The cost of per-block re-encryption is prohibitively expensive for large files. We expect that per-file granularity or per-file-system granularity will be much more common than per-block granularity. For instance, we do not expect users to grant access to portions of a single file. Rather, we expect users would share access-controlled content in collections of files—similar to a collection of Web pages or a directory subtree.

Note that the large file benchmark in this extended document differs from that of previous versions of this paper. Our original file system clients unintentionally prefetched file content. Furthermore, a race condition had the potential to generate unnecessary RPCs to fetch content. The race condition did not affect measurements in the original paper; the correct function always won the race. In later unpublished measurements, the race generated twice as many RPCs as necessary to fetch content. Removing the unintentional prefetching and fixing the race condition with a locking protocol slightly reduced the baseline throughput for sequential reads.

Figure 8:
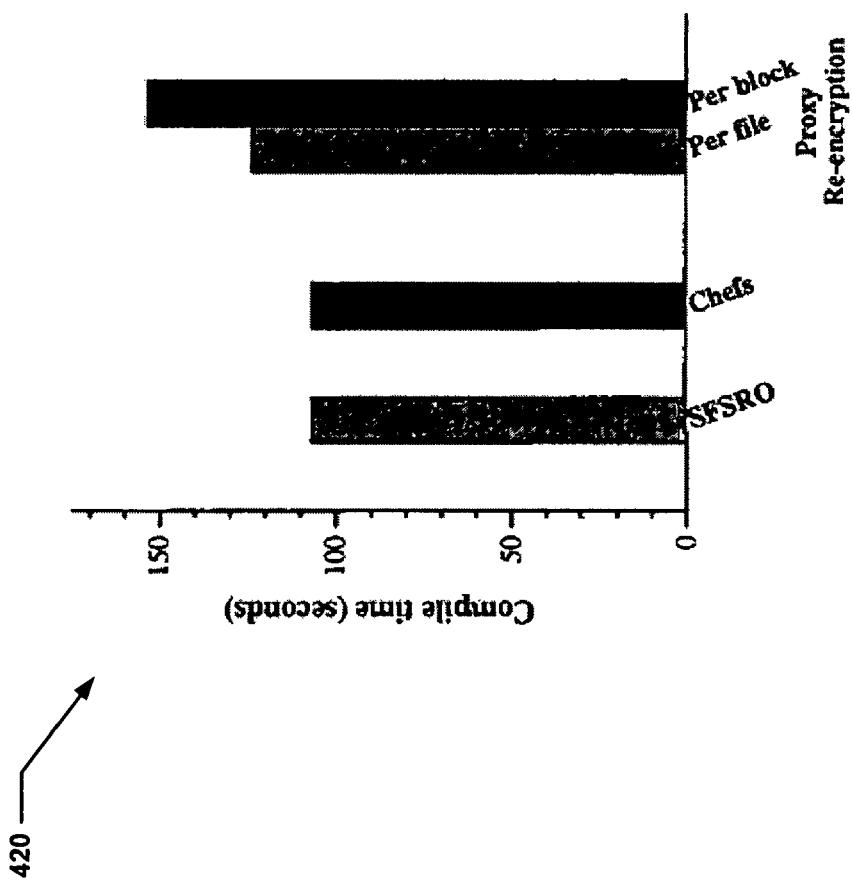
FIG. 8 comprises a graph of application-level benchmarks while performing unidirectional proxy re-encryption.

The application-level benchmark consists of an Emacs version 21.3 compilation. The source code is stored in the file system, while the resulting binaries are written to a local disk. Configure is run first, then compiled with make. This CPU-intensive workload requires access to approximately 300 files. The results of this test are presented in the graph 420 of FIG. 8, and show that the per-file and even per-block proxy cryptography adds negligible overhead for this application workload. We believe the cost is nominal for the additional security semantics of proxy re-encryption. The original paper did not take into account the time to run configure. Therefore, the new timings are slightly longer for all tests.

Figure 9:
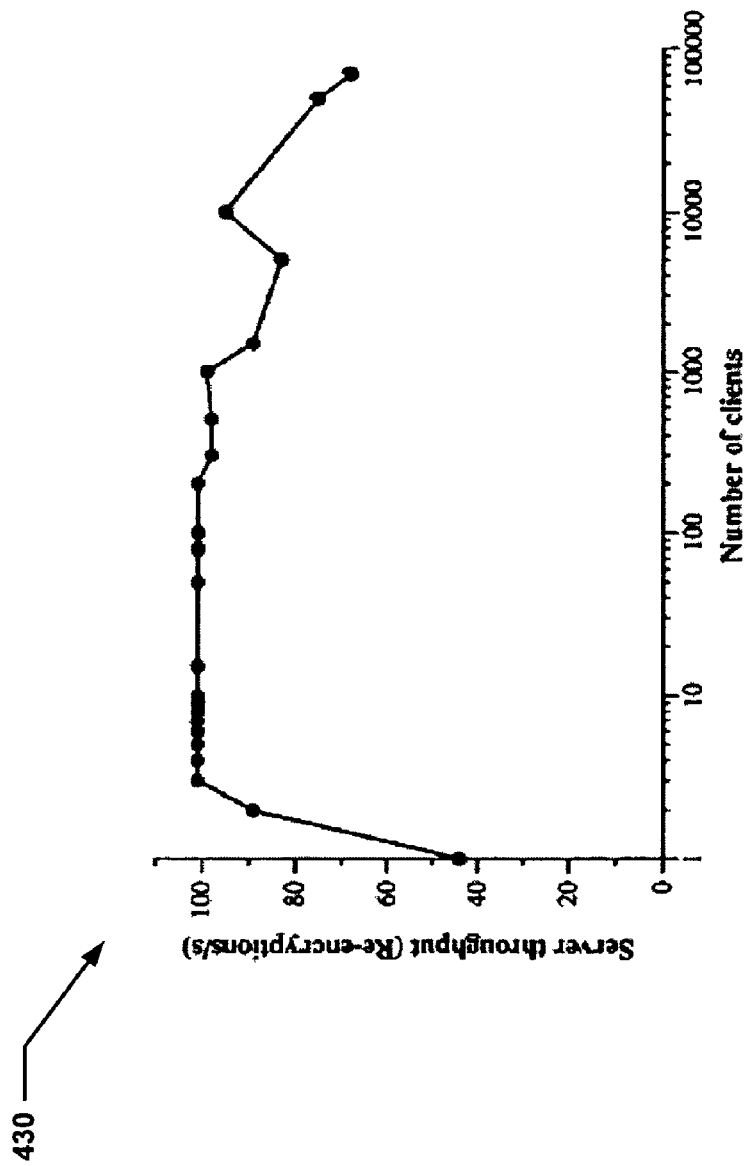
FIG. 9 comprises a graph of aggregate access control server throughput while performing unidirectional proxy re-encryption.

Scalability was also measured to determine how well the access control server performs under a heavy load. FIG. 9 shows a graph 430 reflecting that the proxy re-encryption server can scale up to 1,000 pending requests before exhibiting signs of stress. A trace of proxy re-encryption RPCs was replayed. This required no computation on the client side, but caused the server to perform proxy re-encryption. The test was started by issuing a single request, waiting for the response before issuing another request. To simulate many simultaneous clients, the window size of outstanding RPCs was gradually increased. The server is able to sustain 100 re-encryptions/sec until reaching about 1,000 outstanding requests. The server coped with up to 10,000 outstanding re-encryption requests, but quickly spiraled downwards thereafter.

The access control server acts like a credentials download service. For instance, PDM stores encrypted credentials on a server. A user decrypts the credentials with a password. PDM works fine when an encrypted credential is available to a single individual. However, the file system supports group access control. PDM could have been used instead of the access control server, but this would reduce the key distribution problem to that of sharing a password with all group members.

A single-writer, many-reader file system was selected rather than a general purpose file system to experiment with proxy re-encryption in content distribution. This eliminates problems not directly related to proxy re-encryption, such as fork consistency.

In practice, an organization's data may consist of many distinct file sets or equivalence classes, access to each of which should be limited to a subset of the organization's members. For instance, a large company with several departments might wish to keep data from individual departments confidential within the originating department. However, an access control server shared with other departments would have advantages in reliability and logging. This can easily be achieved by using many different master keys, each of which encrypts content keys for files owned to a different group. The corresponding secret keys can be held by different content owners, whose only operational responsibility is to generate re-encryption keys for new users.

Because there is no fundamental difference in format between a master public key and a user's public key, individual users can use their own public keys as master keys, allowing users to act as content owners of their own personal file sets. Additional possibilities can be achieved if multiple file keys are used to encrypt single files, allowing for files that are available only to users who belong to multiple groups simultaneously.

The experimental results demonstrate the practicality of proxy re-encryption in protecting stored content. Though proxy re-encryption adds a level of overhead to file system, this overhead is not extreme, and can be worth the additional security that comes from using a centralized, semi-trusted access control server. Various system choices, such as parameter sizes and encryption granularity can greatly affect the efficiency of the system; we have selected the ones we believe to be most promising.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that the invention should not be limited to the described embodiments but rather should be limited only by the spirit and scope of the appended claims.

What is claimed is:

1. A computer implemented method for performing unidirectional proxy re-encryption comprising:
    generating, by a computer system, a first key pair comprising a public key (pk) and a secret key (sk), wherein said generating a key pair comprises generating a key pair of the form $pk_a=(Z^{a_1}, g^{a_2})$ and $sk_a=(a_1, a_2)$ wherein g is a generator of a first algebraic group $G_1$, wherein $Z=e(g,g)$ is an element of a second algebraic group $G_2$ and wherein $G_1$ and $G_2$ are of prime order q with a bilinear map $e:G_1 \times \hat{G}_1 \to G_2$;
    generating, by a computer system, a re-encryption key that changes encryptions under a first public key $pk_a$ into encryptions under a second public key $pk_b$ as $rk_{A \to B}$; and
    performing, by a computer system, one of the group consisting of encrypting a message m under public key $pk_a$ producing a ciphertext $c_a$, re-encrypting a ciphertext $c_a$ using the re-encryption key $rk_{A \to B}$ that changes ciphertexts under $pk_a$ into ciphertexts under $pk_b$ to produce a ciphertext $c_b$ under $pk_b$, and decrypting the ciphertext $c_a$ under $pk_a$ to recover the message m.

2. The method of claim 1 further comprising at least one of the group consisting of encrypting a message m under a public key pk producing a first-level ciphertext $c^1$ that cannot be re-encrypted, and decrypting a first-level ciphertext $c^1$ using secret key sk resulting in a message m.

3. The method of claim 1 further comprising performing at least one of the group consisting of producing a decryption of said first level ciphertext $c_a^1$ and producing a decryption of said second ciphertext $c_b^2$.

4. The method of claim 1 wherein said generating a key pair comprises generating a key pair of the form $pk_a=g^a, sk_a=a$ wherein g is a generator of a first algebraic group $G_1$.

5. The method of claim 4 wherein said generating a re-encryption key $rk_{A \to B}$ comprises generating the re-encryption key $rk_{A \to B}=g^{b/a}$.

6. The method of claim 5 wherein said encrypting of a message m comprises performing a first level encryption of a message m under public key $pk_a$ wherein $c_a=(Z^{ak}, mZ^k)$ wherein $Z=e(g,g)$ is an element of a second algebraic group $G_2$, wherein k is a random integer modulo q, and wherein $G_1$ and $G_2$ are algebraic groups and are of prime order q with a bilinear map $e: G_1 \times \hat{G}_1 \to G_2$.

7. The method of claim 5 wherein said second level encryption of a message m comprises performing a second level encryption of a message m under public key $pk_a$ by outputting $c_a^2=(g^{ak}, mZ^k)$ and wherein k is a random integer modulo q.

8. The method of claim 7 wherein said re-encrypting of said second level ciphertext $c_a^2=(X,Y)$ with re-encryption key $rk_{A \to B}$ comprises computing $e(X, rk_{A \to B})=S$ and publishing $c_b^1=(S, Y)$.

9. The method of claim 3 wherein said performing a decryption of said first level ciphertext $c_a^1=(X,Y)$ with secret key $sk_a=a$ by computing $m=Y/X^{\{1/a\}}$.

10. The method of claim 3 wherein said performing a decryption of said second ciphertext $c_b$ wherein $c_b^2=(X,Y)$ with secret key $sk_b=b$ by computing $m=Y/e(X,g)^{1/b}$.

11. The method of claim 1 wherein said generating a re-encryption key $rk_{A \to B}$ comprises generating the re-encryption key $rk_{A \to B}=g^{a_1 b_2} \in G_1$.

12. The method of claim 1 wherein said performing a first level encryption of a message m comprises performing a first level encryption of a message m under $pk_a$ wherein $c_{a,1}=(Z^{a_1 k}, mZ^k)$ wherein $Z=e(g,g)$ is an element of a second algebraic group $G_2$ and wherein $G_1$ and $G_2$ are of prime order q with a bilinear map $e: G_1 \times \hat{G}_1 \to G_2$ and wherein k is a random integer modulo q.

13. The method of claim 12 further comprising outputting $c_{a,2}=(Z^{a_2 k}, mZ^k)$ to achieve proxy invisibility.

14. The method of claim 1 wherein said performing a second level encryption of a message m comprises performing a second level encryption of a message m under public key $pk_a$ by outputting $c_{a,r}=(g^k, mZ^{a_1 k})$ and wherein k is a random integer modulo q.

15. The method of claim 1 wherein said performing re-encryption of said second level ciphertext $c_{a,r}=(X,Y)$ with re-encryption key $rk_{A \to B}$ comprises computing $e(X, rk_{A \to B})=S$ and publishing $C_{b,2}=(S,Y)$.

16. The method of claim 3 wherein said performing a decryption of said first ciphertext $c_a$ wherein $c_{a,i}=(X,Y)$ with secret key $a_i \in sk_a$ by computing $m=Y/X^{1/a_i}$ for $i \in \{1,2\}$.

17. The method of claim 3 wherein said performing a decryption of said second ciphertext $c_b$ wherein $c_{b,r}=(X,Y)$ with secret key $sk_b=(b_1,b_2)$ computing $m=Y/e(X,g)^{b_1}$.

18. The method of claim 6 wherein said bilinear map is selected from the group comprising an admissible map, a symmetric map wherein the first algebraic group is equal to the second algebraic group, and an asymmetric map.

19. A computer implemented method for performing temporary unidirectional proxy re-encryption comprising:
    generating, by a computer system, an arbitrary number of key pairs, each key pair comprising a public key (pk) and a secret key (sk), wherein said generating an arbitrary number of key pairs comprises generating a key pair of the form public key $pk_a=(g^{a_0}, g^{a_r})$, secret key $sk_a=(a_0, a_r)$ wherein g generates a first algebraic group $G_1$ of prime order q, wherein $G_1$ and $G_2$ are of prime order q with a bilinear map $e:G_1 \times \hat{G}_1 \to G_2$, and wherein said bilinear map is selected from the group comprising an admissible map, a symmetric map wherein the first algebraic group is equal to the second algebraic group, and an asymmetric map;
    generating, by a computer system, a temporary public base $h_i$, for time period i for revocation;
    generating, by a computer system, a temporary re-encryption key that changes encryptions during time period i under a first public key $pk_a$ into encryptions for time period i under a second public key $pk_b$ as $rk^i_{A \to B}$; and
    performing, by a computer system, one of the group consisting of encrypting a message m under public key $pk_a$ producing a ciphertext $c_a$ for time period i, re-encrypting a ciphertext $c_a$ for time period i using the re-encryption key $rk_{A \to B}$ that changes ciphertexts under $pk_a$ into ciphertexts under $pk_b$ to produce a ciphertext $c_b$ under $pk_b$, and decrypting a ciphertext $c_a$ for time period i under $pk_a$ to recover the message m.

20. The method of claim 19 further comprising performing at least one of the group consisting of producing a decryption of said first ciphertext and producing a decryption of said second ciphertext.

21. The method of claim 19 further comprising revoking all re-encryption keys system-wide by publishing a new random element $h_i$ in the group $G_1$ for each time period i.

22. The method of claim 19 wherein said generating a temporary re-encryption key $rk^i_{A \to B}$ comprises choosing and storing a random value a random value $b_i$ from the integers modulo q; publishing $h_i^{b_i}$ and computing and publishing $rk^i_{A \to B}=h_i^{a_r b_i/a_0}$.

23. The method of claim 19 wherein said performing a first level encryption of a message m comprises performing a first level encryption of a message m under public key $pk_a$, during time period i by computing $$Z_i^{a_rk} = e(g^{a_r}, h_i)^k$$

and outputting $$(c_{a,r} = Z_i^{a_rk}, mZ_i^k)$$

where k is a random integer modulo q.

24. The method of claim 19 wherein said performing a second level encryption of a message m comprises performing a second level encryption of a message m under public key $pk_a$ during time period i by computing $$Z_i^{a_rk} = e(g^{a_r}, h_i)^k$$

and outputting $$(c_{a,i} = g^{a_0k}, mZ_i^{a_rk})$$

where K is a random integer modulo q.

25. The method of claim 19 wherein said performing re-encryption of said second level ciphertext $c_{a,i}=(X,Y)$ with re-encryption key comprises computing $e(rk_{A \to B}, X)=S$ and publishing $c_{b,r}=(S,Y)$.

26. The method of claim 19 wherein said performing a decryption of said first ciphertext wherein $c_{a,i}=(X,Y)$ with secret key $a_i \epsilon \{a_r, a_1, a_2, \ldots\}$ by computing $m=Y/X^{1/a_i}$.

27. The method of claim 19 wherein said performing a decryption of said second ciphertext wherein $c_{a,j}=(X,Y)$ with secret key secret key $sk_a=(a_0, a_r)$ by computing $m=Y^{a_0}/e(X, h_j)^{a_r}$.

28. The method of claim 13 wherein said proxy invisibility comprises wherein recipients of said message are prevented from determining whether said recipient is an original recipient of said message or whether said message has been re-encrypted from another user's key.

29. The method of claim 19 further comprising providing proxy invisibility wherein said proxy invisibility comprises wherein recipients of said message are prevented from determining whether said recipient is an original recipient of said message or whether said message has been re-encrypted from another user's key.

* * * * *